(12) United States Patent
Kobayashi et al.

(10) Patent No.: US 8,499,457 B2
(45) Date of Patent: Aug. 6, 2013

(54) FIXED CONSTANT VELOCITY UNIVERSAL JOINT, METHOD OF MANUFACTURING FIXED CONSTANT VELOCITY UNIVERSAL JOINT, AND BEARING DEVICE ADAPTED FOR USE IN DRIVING WHEEL AND USING FIXED CONSTANT VELOCITY UNIVERSAL JOINT

(75) Inventors: Masazumi Kobayashi, Iwata (JP); Kisao Yamazaki, Iwata (JP); Minoru Ishijima, Iwata (JP)

(73) Assignee: NTN Corporation, Osaka (JP)

( * ) Notice: Subject to any disclaimer, the term of this patent is extended or adjusted under 35 U.S.C. 154(b) by 97 days.

(21) Appl. No.: 13/123,925

(22) PCT Filed: Oct. 6, 2009

(86) PCT No.: PCT/JP2009/067380
§ 371 (c)(1),
(2), (4) Date: Apr. 13, 2011

(87) PCT Pub. No.: WO2010/052985
PCT Pub. Date: May 14, 2010

(65) Prior Publication Data
US 2011/0212788 A1 Sep. 1, 2011

(30) Foreign Application Priority Data
Nov. 6, 2008 (JP) .................................. 2008-285562

(51) Int. Cl.
*B21D 53/10* (2006.01)
*F16D 3/223* (2011.01)
(52) U.S. Cl.
USPC ........................................ 29/898.07; 464/906
(58) Field of Classification Search
USPC ........... 464/145, 178, 906; 384/544; 72/714; 29/428, 441.1, 898.07
See application file for complete search history.

(56) References Cited

U.S. PATENT DOCUMENTS

| 6,120,382 A | 9/2000 | Sone et al. |
| 6,135,891 A | 10/2000 | Sone et al. |

(Continued)

FOREIGN PATENT DOCUMENTS

| DE | 198 43 632 | 4/1999 |
| EP | 0 802 341 | 10/1997 |

(Continued)

OTHER PUBLICATIONS

Supplementary European Search Report issued Mar. 29, 2012 in corresponding European Patent Application No. 09824685.3.

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A fixed type constant velocity universal joint includes an outer joint member, an inner joint member, a plurality of balls interposed between the outer and inner joint members, and a cage to hold the plurality of balls. At least one of the plurality of track grooves of the outer joint member and the plurality of track grooves of the inner joint member is formed by cold-forging finishing. The outer joint member, the inner joint member, the balls, and the cage are assembled to each other based on matching in which the plurality of balls and the cage each having a rank corresponding to a measured value of a pitch circle diameter of the outer joint member and to a measured value of a pitch circle diameter of the inner joint member, which have been arbitrarily selected, are selected with respect to the arbitrarily selected outer and inner joint members.

1 Claim, 20 Drawing Sheets

U.S. PATENT DOCUMENTS

| | | | |
|---|---|---|---|
| 6,224,490 B1 | 5/2001 | Iihara et al. | |
| 6,267,682 B1 | 7/2001 | Sone et al. | |
| 6,506,121 B2 * | 1/2003 | Kobayashi et al. | 464/145 |
| 6,780,114 B2 * | 8/2004 | Sahashi et al. | 464/906 X |
| 8,182,352 B2 * | 5/2012 | Kobayashi | 464/145 |
| 2008/0090665 A1 | 4/2008 | Usui et al. | |
| 2009/0317177 A1 | 12/2009 | Nakagawa et al. | |
| 2010/0069164 A1 | 3/2010 | Kobayashi et al. | |
| 2010/0113168 A1 | 5/2010 | Kobayashi | |
| 2010/0215302 A1 | 8/2010 | Torii et al. | |
| 2010/0234115 A1 | 9/2010 | Yoshida et al. | |

FOREIGN PATENT DOCUMENTS

| | | | |
|---|---|---|---|
| EP | 1 813 837 | | 8/2007 |
| EP | 2 042 764 | | 4/2009 |
| EP | 2 119 929 | | 11/2009 |
| EP | 2 128 466 | | 12/2009 |
| EP | 2 133 216 | | 12/2009 |
| EP | 2 133 582 | | 12/2009 |
| JP | 58-30030 | | 2/1983 |
| JP | 63-034323 | | 2/1988 |
| JP | 1-55688 | | 11/1989 |
| JP | 02271109 | * | 11/1990 |
| JP | 2000-145805 | | 5/2000 |
| JP | 2000-230568 | | 8/2000 |
| JP | 2006-144814 | | 6/2006 |
| JP | 2006-258207 | | 9/2006 |
| JP | 2006258207 | * | 9/2006 |
| JP | 2008-008474 | | 1/2008 |
| JP | 2008008474 | * | 1/2008 |
| JP | 2008-25641 | | 2/2008 |
| JP | 2008-111469 | | 5/2008 |
| JP | 2008-121791 | | 5/2008 |
| JP | 2008111469 | * | 5/2008 |
| JP | 2008121791 | * | 5/2008 |
| JP | 2008-190589 | | 8/2008 |
| JP | 2008-230487 | | 10/2008 |
| JP | 2008-232293 | | 10/2008 |
| JP | 2008-256022 | | 10/2008 |
| JP | 2008-260435 | | 10/2008 |
| WO | 2006/054614 | | 5/2006 |
| WO | 2007/148487 | | 12/2007 |
| WO | 2008/010340 | | 1/2008 |
| WO | 2008/088007 | | 7/2008 |
| WO | 2008/096557 | | 8/2008 |
| WO | 2008/114574 | | 9/2008 |
| WO | 2008/114698 | | 9/2008 |

OTHER PUBLICATIONS

International Search Report issued Nov. 24, 2009 in International (PCT) Application No. PCT/JP2009/067380.

International Preliminary Report on Patentability and Written Opinion of the International Searching Authority issued Jun. 30, 2011 in International (PCT) Application No. PCT/JP2009/067380.

* cited by examiner

| | OFFSET ANGLE | | | | | | | | |
|---|---|---|---|---|---|---|---|---|---|
| | 8.0 | 10.0 | 11.0 | 12.0 | 13.0 | 14.0 | 15.0 | 16.0 | 20.0 |
| CROSSWISE OPERABILITY | × | × | ○ | ○ | ○ | ○ | ○ | ◎ | ◎ |
| DURABILITY | × | × | ◎ | ◎ | ◎ | ◎ | ◎ | ○ | × |
| STRENGTH | × | × | ◎ | ◎ | ◎ | ◎ | ◎ | △ | × |

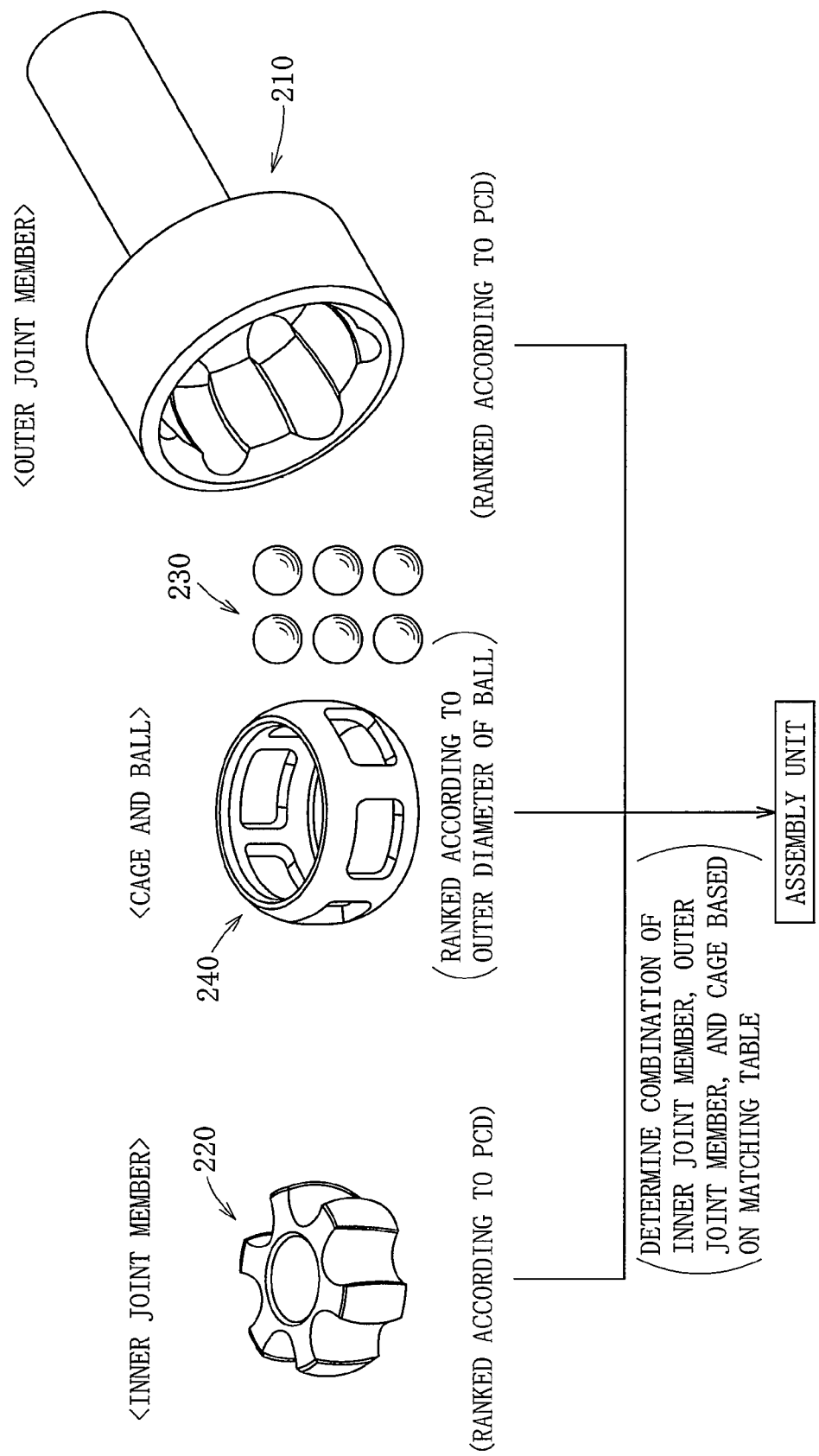

FIXED CONSTANT VELOCITY UNIVERSAL JOINT, METHOD OF MANUFACTURING FIXED CONSTANT VELOCITY UNIVERSAL JOINT, AND BEARING DEVICE ADAPTED FOR USE IN DRIVING WHEEL AND USING FIXED CONSTANT VELOCITY UNIVERSAL JOINT

TECHNICAL FIELD

The present invention relates to a fixed type constant velocity universal joint, a method of manufacturing the fixed type constant velocity universal joint, and a driving-wheel bearing unit using the fixed type constant velocity universal joint, the fixed type constant velocity universal joint being used, for example, in a power transmission system for automobiles and various industrial machines, and allowing only angular displacement between two shafts on a driving side and a driven side.

BACKGROUND ART

In a power transmission system for automobiles and various industrial machines, for example, in a drive shaft for front-wheel drive vehicles and for rear-wheel drive vehicles of an independent suspension type, as means for transmitting a rotational force at a constant velocity from an engine of the automobile to a wheel, there have been used a fixed type constant velocity universal joint which allows only angular displacement and a plunging type constant velocity universal joint which allows both angular displacement and axial displacement.

The drive shaft described above includes a propeller shaft for transmitting a rotational driving force from a transmission to a differential and a half shaft for transmitting a rotational driving force from the differential to a wheel. Further, a Birfield type constant velocity universal joint (BJ) is well-known as the fixed type constant velocity universal joint, and a double offset type constant velocity universal joint (DOJ) is well-known as the plunging type constant velocity universal joint.

For example, the fixed type constant velocity universal joint of the BJ type includes, as main components, an outer joint member having an inner spherical surface provided with a plurality of track grooves extending in an axial direction, an inner joint member having an outer spherical surface provided with track grooves extending in the axial direction in pairs with the track grooves of the outer joint member, a plurality of balls interposed between the track grooves of the outer joint member and the track grooves of the inner joint member so as to transmit torque, and a cage interposed between the inner spherical surface of the outer joint member and the outer spherical surface of the inner joint member so as to hold the balls. The plurality of balls are respectively housed in pockets formed in the cage and equiangularly arranged.

The outer joint member and the inner joint member in the fixed type constant velocity universal joint are generally manufactured by the following procedure. First, a columnar billet is roughly formed into a shape of the outer joint member or the inner joint member by hot forging, warm forging, or cold forging, and then lathing is performed on an outer spherical surface, an inner spherical surface, and an end surface of this raw material. After that, heat treatment is performed, and then the outer spherical surface, the inner spherical surface, and the track grooves are finished by grinding, quenched-steel trimming, or the like. In this manner, the outer joint member and the inner joint member are manufactured.

When an inner component including the inner joint member together with the balls and the cage is incorporated into the outer joint member, the outer joint member and the inner joint member manufactured as described above are selectively combined with each other so that PCD gaps and the like fall within a range of defined values.

In other words, as illustrated in FIG. 28, many outer joint members 210 and inner joint members 220 are ranked according to a PCD, and cages 240 having pocket widths in conformity with balls 230 are ranked according to the pocket widths.

From among the outer joint members 210, the inner joint members 220, the balls 230, and the cages 240 ranked into a plurality of ranks as described above, in consideration of combinations of components including the outer joint members 210, the inner joint members 220, the balls 230, and the cages 240 so that the PCD gaps and the like fall within the range of the defined values, and based on a matching table, the outer joint members 210, the inner joint members 220, the balls 230, and the cages 240 are selected and combined with each other (for example, refer to Patent Literatures 1 and 2).

CITATION LIST

Patent Literature

Patent Literature 1: JP 01-55688 B
Patent Literature 2: JP 63-34323 A

SUMMARY OF INVENTION

Technical Problems

By the way, the outer joint members 210 and the inner joint members 220 which are described above as components of the conventional fixed type constant velocity universal joint are manufactured through forging, lathing, heat treatment, and finally, a finishing process such as grinding on the track grooves. The finishing process performed in this manner on the track grooves after forging, lathing, and heat treatment has the following inconveniences: facilities and tools for the finishing process on the track grooves involve high cost; the finishing process takes a long time period; and yields of raw materials are poor.

Further, conventionally, when an inner component including the inner joint member 220, the balls 230, and the cage 240 is incorporated into the outer joint member 210, from among the many ranked outer joint members 210, inner joint members 220, balls 230, and cages 240, the components including the outer joint members 210, the inner joint members 220, the balls 230, and the cages 240 are selected based on the matching table and combined with each other so that the PCD gaps and the like fall within the range of the defined values. The selection and combination have a problem in that the combination of the components involves time and effort, which leads to poor workability.

Under the circumstances, the present invention has been proposed in view of the above-mentioned problems. It is an object of the present invention to provide at low cost a fixed type constant velocity universal joint, a method of manufacturing the fixed type constant velocity universal joint, and a driving-wheel bearing unit using the fixed type constant velocity universal joint, the fixed type constant velocity universal joint including an outer joint member or an inner joint member which is manufactured in a simplified manner.

Solution to Problem

As technical means for achieving the above-mentioned object, the present invention provides a fixed type constant velocity universal joint including: an outer joint member having an inner spherical surface provided with a plurality of track grooves extending in an axial direction; an inner joint member having an outer spherical surface provided with a plurality of track grooves extending in the axial direction in pairs with the plurality of track grooves of the outer joint member; a plurality of balls interposed between the plurality of track grooves of the outer joint member and the plurality of track grooves of the inner joint member so as to transmit torque; and a cage interposed between the inner spherical surface of the outer joint member and the outer spherical surface of the inner joint member so as to hold the plurality of balls, at least one of the plurality of track grooves of the outer joint member and the plurality of track grooves of the inner joint member being formed by cold-forging finishing, in which components including the outer joint member, the inner joint member, the plurality of balls, and the cage are assembled to each other based on matching in which the plurality of balls and the cage each having a rank corresponding to a measured value of a PCD of the outer joint member, which has been arbitrarily selected, and to a measured value of a PCD of the inner joint member, which has been arbitrarily selected, are selected with respect to the arbitrarily selected outer joint member and the arbitrarily selected inner joint member.

Further, the present invention provides a method of manufacturing a fixed type constant velocity universal joint, the fixed type constant velocity universal joint including: an outer joint member having a cup-like shape so as to open at one end and an inner spherical surface provided with a plurality of track grooves extending in an axial direction; an inner joint member having an outer spherical surface provided with a plurality of track grooves extending in the axial direction in pairs with the plurality of track grooves of the outer joint member; a plurality of balls interposed between the plurality of track grooves of the outer joint member and the plurality of track grooves of the inner joint member so as to transmit torque; and a cage interposed between the inner spherical surface of the outer joint member and the outer spherical surface of the inner joint member so as to hold the plurality of balls, at least one of the plurality of track grooves of the outer joint member and the plurality of track grooves of the inner joint member being formed by cold-forging finishing, the method including: ranking, according to outer diameters of the plurality of balls, cages having pocket widths in conformity with the outer diameters of the plurality of balls; measuring a PCD of the outer joint member, which has been arbitrarily selected, and a PCD of the inner joint member, which has been arbitrarily selected; and combining components including the outer joint member, the inner joint member, the plurality of balls, and the cage with each other based on matching in which the plurality of balls and the cage each having a rank corresponding to a measured value of the PCD of the arbitrarily selected outer joint member and to a measured value of the PCD of the arbitrarily selected inner joint member are selected with respect to the arbitrarily selected outer joint member and the arbitrarily selected inner joint member. Note that, the PCD of the outer joint member represents a pitch circle diameter of each of the plurality of balls in a state of being held in contact with the plurality of track grooves of the outer joint member, and the PCD of the inner joint member represents a pitch circle diameter of each of the plurality of balls in a state of being held in contact with the plurality of track grooves of the inner joint member.

In the present invention, at least one of the plurality of track grooves of the outer joint member and the plurality of track grooves of the inner joint member are formed by cold-forging finishing. Thus, the plurality of track grooves are formed only by cold-forging finishing. Thus, many conventional machine processes performed after cold forging can be omitted such as a trimming process and a grinding process. As a result, a yield increases, and hence cost of the constant velocity universal joint can be reduced.

As described above, the components including the outer joint member, the inner joint member, the plurality of balls, and the cage are combined with each other based on the simple matching in which the plurality of balls and the cage each having the rank corresponding to the measured value of the PCD of the arbitrarily selected outer joint member and to the measured value of the PCD of the arbitrarily selected inner joint member are selected with respect to the arbitrarily selected outer joint member and the arbitrarily selected inner joint member. Specifically, the components including the outer joint member, the inner joint member, the plurality of balls, and the cage are combined with each other by the following: ranking, according to the outer diameters of the plurality of balls, the cages having the pocket widths in conformity with the outer diameters of the plurality of balls; measuring the PCD of the arbitrarily selected outer joint member and the PCD of the arbitrarily selected inner joint member; and matching in which the plurality of balls and the cage each having the rank corresponding to the measured value of the PCD of the arbitrarily selected outer joint member and to the measured value of the PCD of the arbitrarily selected inner joint member are selected with respect to the arbitrarily selected outer joint member and the arbitrarily selected inner joint member. Thus, conventional matching is not performed in which all the components of the outer joint members, the inner joint members, the plurality of balls, and the cages are ranked, and then the components including the outer joint members, the inner joint members, the plurality of balls, and the cages are selected and combined with each other. As a result, the components can be assembled rapidly and easily, and hence a yield can be increased and workability can be enhanced.

According to the present invention, it is preferred that each of the plurality of track grooves of the outer joint member and the plurality of track grooves of the inner joint member have a lateral-sectional Gothic arch shape of being held in angular contact with the plurality of balls, and that an angle formed by the angular contact be set to range from 35° to 45°.

As described above, when each of the plurality of track grooves of the outer joint member and the plurality of track grooves of the inner joint member has the lateral-sectional Gothic arch shape of being held in angular contact with the plurality of balls, and when the angle formed by the angular contact is set to range from 35° to 45°, the contact state of the plurality of balls with respect to the plurality of track grooves can be stabilized. In this context, when the contact angle described above is smaller than 35°, track-surface pressure becomes higher, which may lead to a risk of deterioration of durability. In contrast, when the contact angle is larger than 45°, margins allowing the plurality of balls to climb onto track shoulder portions at high operating angles decrease. As a result, at the time of high-torque application, the plurality of balls climb onto the track shoulder portions while forming contact ellipses, which may lead to a risk of chipping of the track shoulder portions, and the like.

According to the present invention, it is preferred that at least at one of an opening end of each of the plurality of track grooves of the outer joint member and an opening end of each of the plurality of track grooves of the inner joint member, cutout round portions be formed at least at parts corresponding to ball-contact points.

As described above, when, at least at the one of the opening end of each of the plurality of track grooves of the outer joint member and the opening end of each of the plurality of track grooves of the inner joint member, the cutout round portions are formed at least at the parts corresponding to the ball-contact points, the following advantage can be obtained: at the time of operation of the constant velocity universal joint at high angles, specifically, even when angles expected during use are exceeded for some reason so that each of the plurality of balls comes to a position at an axial end portion of each of the plurality of track grooves of the outer joint member or each of the plurality of track grooves of the inner joint member, the cutout round portions prevent each of the plurality of balls from biting into the axial end portion.

According to the present invention, it is preferred that the plurality of track grooves and the cutout round portions of the outer joint member and the plurality of track grooves and the cutout round portions of the inner joint member be formed by simultaneous cold-forging finishing.

As described above, when the plurality of track grooves and the cutout round portions of the outer joint member and the plurality of track grooves and the cutout round portions of the inner joint member are formed by simultaneous cold-forging finishing, it is unnecessary to perform, after formation of the plurality of track grooves, a machining process such as lathing and grinding finishing after heat treatment. Thus, the plurality of track grooves and the cutout round portions are formed only by simultaneous cold-forging finishing, with the result that formation of the cutout round portions can be simplified, and cost of the constant velocity universal joint can be reduced.

According to the present invention, it is preferred that the outer joint member include the following formed by cold-forging finishing: inlet chamfers formed along an entire opening periphery; track chamfers formed along boundary portions between the inner spherical surface and the plurality of track grooves; and track-inlet chamfers formed along boundary portions between the plurality of track grooves and the inlet chamfers, and that parts except for a boot recessed groove formed in an outer peripheral surface of the opening end of the outer joint member be formed by cold-forging finishing.

As described above, when the inlet chamfers, the track chamfers, and the track-inlet chamfers of the outer joint member are formed by cold-forging finishing, the inlet chamfers, the track chamfers, and the track-inlet chamfers are formed only by cold-forging finishing. Thus, many conventional machine processes performed after cold forging can be omitted such as a trimming process and a grinding process. As a result, a yield further increases, and hence cost of the constant velocity universal joint can be further reduced. Further, when the parts except for the boot recessed groove formed in the outer peripheral surface of the outer joint member are formed by cold-forging finishing, the outer peripheral surface can be endowed with higher hardness, and torsional strength can be increased. In addition, work man-hours are reduced, and hence cost of the constant velocity universal joint can be reduced.

According to the present invention, it is preferred that the plurality of track grooves and the track-inlet chamfers of the outer joint member be formed by simultaneous cold-forging finishing.

As described above, when the plurality of track grooves and the track-inlet chamfers of the outer joint member are formed by simultaneous cold-forging finishing, it is unnecessary to perform, after formation of the plurality of track grooves, a machining process such as lathing and grinding finishing after heat treatment. Thus, the plurality of track grooves and the track-inlet chamfers are formed only by simultaneous cold-forging finishing, with the result that formation of the track-inlet chamfers can be simplified, and cost of the constant velocity universal joint can be reduced.

According to the present invention, it is preferred that the track chamfers formed along the boundary portions between the inner spherical surface and the plurality of track grooves of the outer joint member and track chamfers formed along boundary portions between the outer spherical surface and the plurality of track grooves of the inner joint member be each formed in a round shape.

As described above, when the track chamfers formed along the boundary portions between the inner spherical surface and the plurality of track grooves of the outer joint member and the track chamfers formed along the boundary portions between the outer spherical surface and the plurality of track grooves of the inner joint member are each formed in the round shape, stress concentration thereat can be avoided. Note that, the round-shaped track chamfers may be formed not by cold-forging finishing but by a machining process such as lathing after cold forging and grinding finishing after heat treatment.

According to the present invention, it is preferred that the plurality of track grooves and the track chamfers of the outer joint member and the plurality of track grooves and the track chamfers of the inner joint member be formed by simultaneous cold-forging finishing.

As described above, when the plurality of track grooves and the track chamfers of the outer joint member and the plurality of track grooves and the track chamfers of the inner joint member are formed by simultaneous cold-forging finishing, it is unnecessary to perform, after formation of the plurality of track grooves, a machining process such as lathing and grinding finishing after heat treatment. Thus, the plurality of track grooves and the track chamfers are formed only by simultaneous cold-forging finishing, with the result that formation of the track chamfers can be simplified, and cost of the constant velocity universal joint can be reduced.

According to the present invention, it is preferred that slit grooves extending in the axial direction be formed between the plurality of track grooves adjacent to each other in a circumferential direction along the inner spherical surface of the outer joint member, and that a width dimension of each of the slit grooves be set to range from 5% to 30% of a maximum width dimension of the inner spherical surface between the plurality of track grooves adjacent to each other in the circumferential direction.

As described above, when the slit grooves extending in the axial direction are formed between the plurality of track grooves adjacent to each other in the circumferential direction along the inner spherical surface of the outer joint member, at the time of cold-forging finishing, extruded portions of a raw material of the outer joint member do not intrude into gaps of a molding die for cold-forging finishing. Thus, the inner spherical surface can be formed with desired shape accuracy. In particular, when the width dimension of each of the slit grooves is set to range from 5% to 30%, it is easy to demold the outer joint member from the molding die at the time of cold-forging finishing. In addition, an area required for the inner spherical surface of the outer joint member can be secured, and hence required strength and durability can be secured. Note that, when the width dimension of each of the slit grooves is smaller than 5%, it is difficult to demold the outer race joint member from the molding die at the time of cold-forging finishing. Meanwhile, when the width dimension of each of the slit grooves is larger than 30%, it is difficult to secure the area required for the inner spherical surface of the outer joint member, which leads to reduction of strength and deterioration of durability.

According to the present invention, it is preferred that an offset angle of a ball track be set to range from 11.0° to 15.0°, the ball track being formed of each of the plurality of track grooves of the outer joint member and corresponding one of the plurality of track grooves of the inner joint member in cooperation with the plurality of track grooves of the outer joint member. Here, the offset angle represents an angle which a curvature center of each of the plurality of track grooves of the outer joint member and a curvature center of each of the plurality of track grooves of the inner joint member form together with respect to a ball center.

As described above, when the offset angle of each of the ball tracks is set to range from 11.0° to 15.0°, operability, durability, and quasi-static torsional strength can be simultaneously satisfied. In this context, when the offset angle is smaller than 11.0°, there are problems in all the following aspects: crosswise operability; durability; and quasi-static torsional strength. Meanwhile, when the offset angle is larger than 15.0°, the constant velocity universal joint is poor in durability and strength.

According to the present invention, it is preferred that a spherical angle formed at a position on a joint-opening side of the outer spherical surface of the inner joint member be set to be equal to or more than 12.5°. Here, the "joint-opening side" represents an opening side of the outer joint member. In addition, the "spherical angle" represents an axial angle formed by a joint-opening-side end portion of the outer spherical surface with respect to a curvature center of the outer spherical surface of the inner joint member (joint center).

As described above, when the spherical angle formed at the position on the joint-opening side of the outer spherical surface of the inner joint member is set to be equal to or more than 12.5°, the following advantage can be obtained: at high operating angles and at the time of high-torque application, even when the large spherical force acts from the outer spherical surface of the inner joint member onto the inner spherical surface of the cage, an area in which the joint-opening-side end portion of the outer spherical surface of the inner joint member comes into contact with the inner spherical surface of the cage can be secured as an area sufficient for bearing the above-mentioned spherical force. By securing of the contact area, the cage is allowed to avoid application of excessive load, and hence smooth rotation can be secured.

According to the present invention, it is preferred that a step portion be provided in the axial direction between a joint-opening-side end surface of the inner joint member and a spline end portion of a shaft hole formed in the inner joint member so that a recessed end surface is formed at a position on an inner side with respect to the joint-opening-side end surface of the inner joint member. Here, the "joint-opening-side end surface of the inner joint member" represents an end surface at a position on the outer-joint-member opening side in the inner joint member, in other words, on an insertion side of a shaft member to be press-fit to the shaft hole of the inner joint member. Further, the "spline end portion of the shaft hole" represents an end portion at a position on the outer-joint-member opening side of the spline of the shaft hole, in other words, on the insertion side of the shaft member to be press-fit to the shaft hole of the inner joint member. Still further, the "step portion in the axial direction" represents a step formed of the joint-opening-side end surface of the inner joint member, the end surface being recessed in the axial direction.

Even when a thickness of the inner joint member is reduced for weight reduction and compactification of the constant velocity universal joint, the step portion is provided in the axial direction between the joint-opening-side end surface of the inner joint member and the spline end portion of the shaft hole so that the recessed end surface is formed at the position on the inner side with respect to the joint-opening-side end surface. Thus, a thickness of the recessed end surface, in other words, of a bottom portion of each of the plurality of track grooves (refer to an N portion of a product of the present invention: radial dimension $L_2$) can be increased in comparison with that of the conventional products (refer to an M portion of a conventional product: radial dimension $L_1$). Thus, even at high operating angles and at the time of high-torque application, strength of the inner joint member can be sufficiently secured.

Note that, it is preferred that the recessed end surface be formed at a part corresponding to a bottom portion of each of the plurality of track grooves. As described above, when the recessed end surface is formed at the part corresponding to the bottom portion of each of the plurality of track grooves, a ball-contact point does not get out of each of the plurality of track grooves even when the constant velocity universal joint forms a high operating angle. Thus, torque is efficiently and reliably transmitted.

According to the present invention, it is preferred that a tapered relief portion retracted with respect to the outer spherical surface of the inner joint member be formed at a joint-inner-side end portion of the outer spherical surface, and have a small curvature radius so as to be smoothly continuous with the outer spherical surface.

As described above, when the tapered relief portion retracted with respect to the outer spherical surface of the inner joint member is formed at the joint-inner-side end portion of the outer spherical surface, and has the small curvature radius so as to be smoothly continuous with the outer spherical surface, the radially inner surface of the cage is free from being bitten by the joint-inner-side end portion the inner joint member.

According to the present invention, it is preferred that a curvature center of each of the plurality of track grooves of the outer joint member be shifted in a radial direction to such a position as to have a radius larger than a radius formed at a position on a joint axis. Further, it is preferred that a curvature center of each of the plurality of track grooves of the inner joint member be shifted in the radial direction to such a position as to have a radius smaller than a radius formed at a position on the joint axis.

As described above, when the curvature center of each of the plurality of track grooves of the outer joint member is shifted in the radial direction to such a position as to have the radius larger than the radius formed at the position on the joint axis, or when the curvature center of each of the plurality of track grooves of the inner joint member is shifted in the radial direction to such a position as to have the radius smaller than the radius formed at the position on the joint axis, gaps can be closed at central positions in the axial direction of the plurality of track grooves. As a result, backlash can be easily eliminated, and hence generation of abnormal noise can be suppressed.

A driving-wheel bearing unit can be obtained which includes a fixed type constant velocity universal joint having the structure described above and a wheel bearing including the hub wheel coupled to the stem portion extending in the axial direction from the outer joint member of the fixed type constant velocity universal joint.

In that case, when the hub wheel and the outer joint member are coupled integrally to each other by a projection-recess fitting structure in which projecting portions extending in the axial direction are formed at a plurality of parts in the circumferential direction along any one of an inner diameter of the hub wheel and an outer diameter of the stem portion of the outer joint member, and, by press-fitting of the any one of the inner diameter and the outer diameter to another of the inner diameter and the outer diameter, recessed portions to be closely fitted to the projecting portions are formed along the another of the inner diameter and the outer diameter, an integrated type driving-wheel bearing unit can be obtained which includes the constant velocity universal joint and the wheel bearing.

Alternatively, when the hub wheel and the outer joint member are coupled to each other so as to be separable by an axial pulling-out force imparted thereto, by the projection-recess fitting structure in which the projecting portions extending in the axial direction are formed at the plurality of parts in the circumferential direction along any one of the inner diameter of the hub wheel and the outer diameter of the stem portion of the outer joint member, and, by press-fitting of the any one of the inner diameter and the outer diameter to the another of the inner diameter and the outer diameter, the recessed portions to be closely fitted to the projecting portions are formed along the another of the inner diameter and the outer diameter, a separate type driving-wheel bearing unit can be obtained which includes the constant velocity universal joint and the wheel bearing.

In each of the driving-wheel bearing units, the projection-recess fitting structure is configured in which the projecting portions extending in the axial direction are formed at the plurality of parts in the circumferential direction along any-one of the inner diameter of the hub wheel and the outer diameter of the stem portion of the outer joint member, and, by press-fitting of the any one of the inner diameter and the outer diameter to the another of the inner diameter and the outer diameter, the recessed portions to be closely fitted to the projecting portions are formed along the another of the inner diameter and the outer diameter. In the projection-recess fitting structure, it is effective to form, by transferring of shapes of the projecting portions formed along any one of the inner diameter of the hub wheel and the outer diameter of the stem portion of the outer joint member onto the another of the inner diameter and the outer diameter, which has hardness lower than that of the projecting portions, the recessed portions to be closely fitted to the projecting portions along the another of the inner diameter and the outer diameter, the transferring being caused by elastic deformation at the time of press fitting.

In other words, along with plastic deformation and trimming, the shapes of the projecting portions are transferred onto a recessed-portion forming surface on a counterpart side. In this case, when the projecting portions bite into the recessed-portion forming surface on the counterpart side, the recessed-portion forming surface enters a state of being slightly elastically deformed. As a result, the projecting portions are allowed to move in the axial direction. When the projecting portions stop moving in the axial direction, the elastic deformation of the recessed-portion forming surface restores. With this, the entire of recessed-portion fitting parts of the projecting portions is brought into close contact with the recessed portions corresponding thereto, and hence the outer joint member and the hub wheel can be firmly coupled to and integrated with each other.

Meanwhile, in the present invention, by the above-mentioned projection-recess fitting structure, the hub wheel and the outer joint member are coupled to each other so as to be separable by the axial pulling-out force imparted thereto. In this manner, the hub wheel and the outer joint member are separable from each other, and hence maintenance work on the driving-wheel bearing device is facilitated in which any one of the constant velocity universal joint and the wheel bearing are replaced.

Advantageous Effects of Invention

According to the present invention, the components including the outer joint member, the inner joint member, the plurality of balls, and the cage are combined with each other based on the matching in which the plurality of balls and the cage each having the rank corresponding to the measured value of the PCD of the arbitrarily selected outer joint member and to the measured value of the PCD of the arbitrarily selected inner joint member are selected with respect to the arbitrarily selected outer joint member and the arbitrarily selected inner joint member. Thus, the conventional matching is not performed in which all the components of the outer joint members, the inner joint members, the plurality of balls, and the cages are ranked, and then the components including the outer joint members, the inner joint members, the plurality of balls, and the cages are selected and combined with each other. As a result, the components can be assembled rapidly and easily, and hence the yield can be increased and workability can be enhanced. Therefore, cost of the constant velocity universal joint can be reduced.

BRIEF DESCRIPTION OF DRAWINGS

FIG. 28 A schematic structural view for illustrating matching of components in manufacture of conventional constant velocity universal joints.

DETAILED DESCRIPTION OF THE INVENTION

Detailed description is made of an embodiment of a fixed type constant velocity universal joint according to the present invention and a driving-wheel bearing unit using the fixed type constant velocity universal joint. In the following part in this embodiment, a Birfield type constant velocity universal joint (BJ) is illustrated as an example of one of fixed type constant velocity universal joints.

Figure 1:
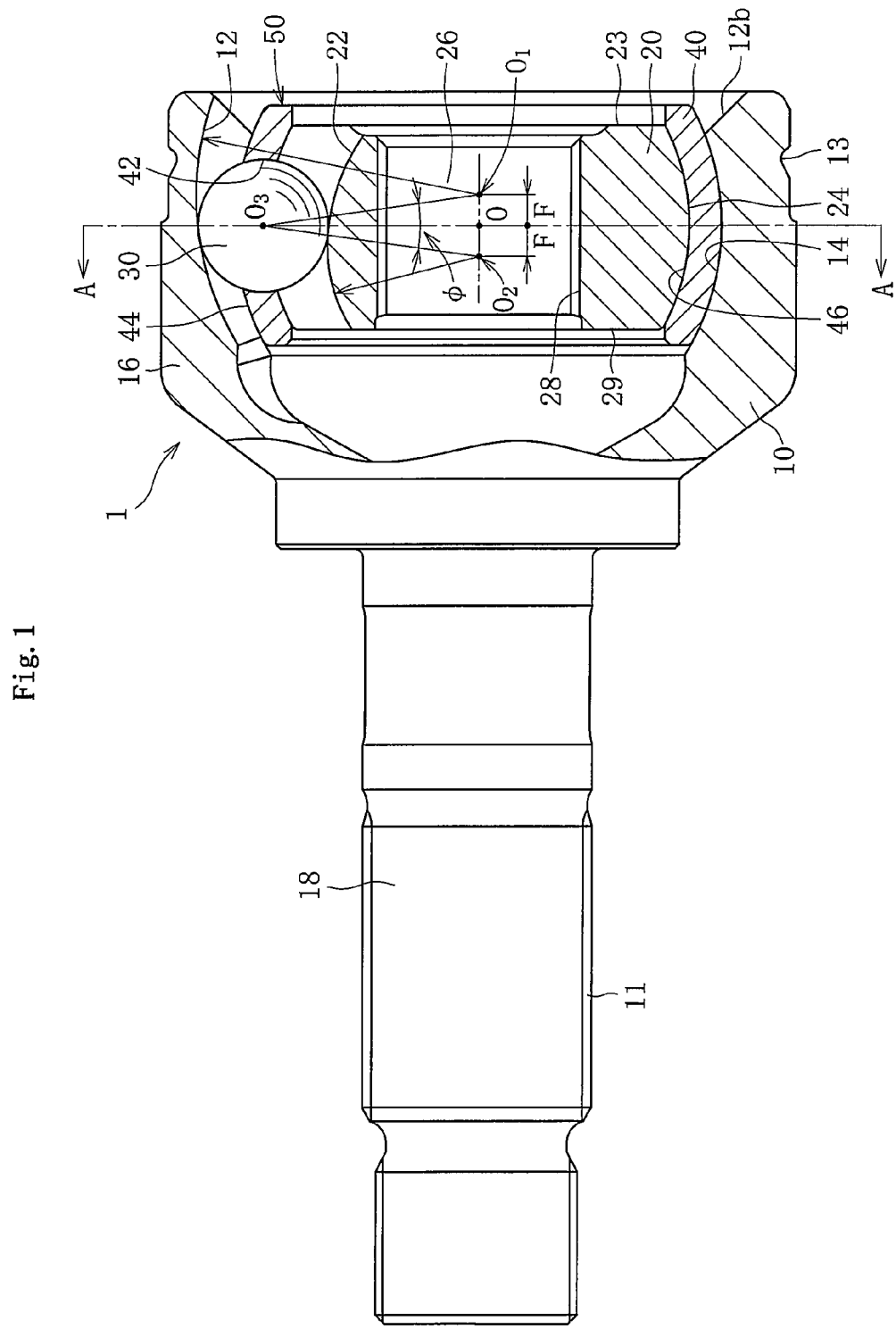
FIG. 1 A sectional view taken along the line B-O-B of FIG. 2, illustrating an embodiment of a fixed type constant velocity universal joint according to the present invention, specifically, an overall structure of a Birfield type constant velocity universal joint.
Figure 2:
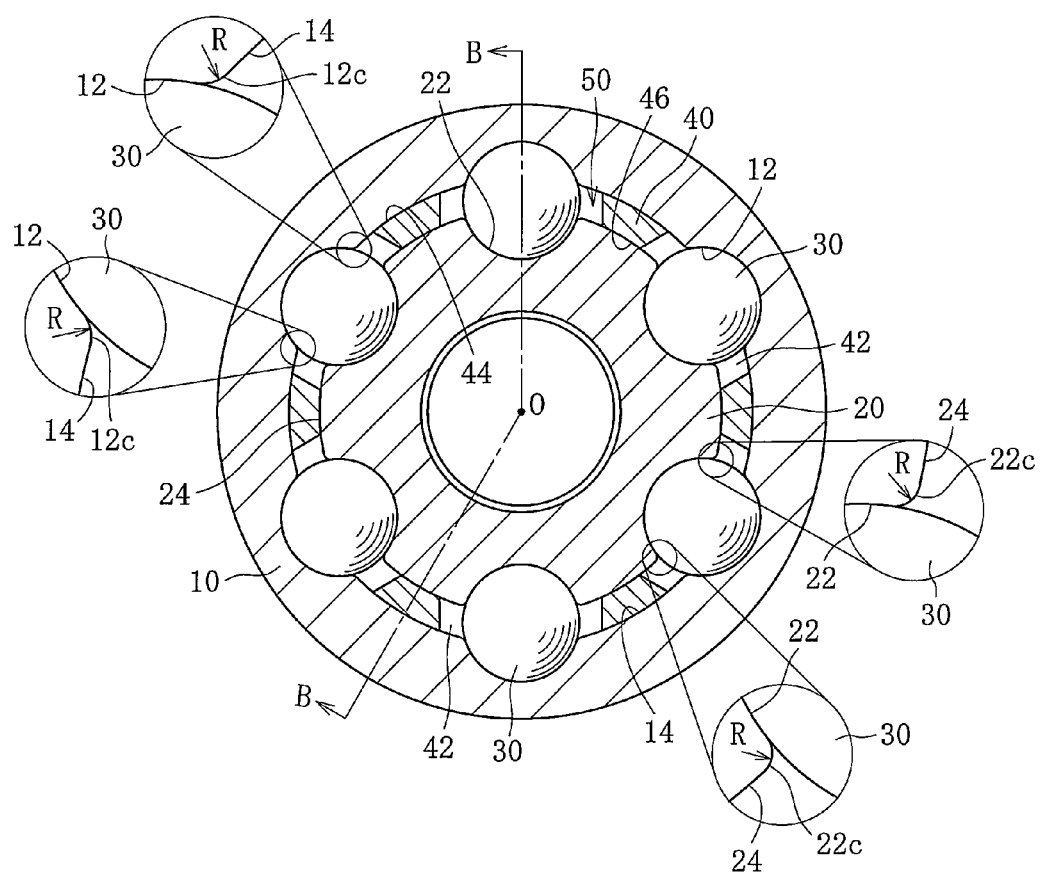
FIG. 2 A sectional view taken along the line A-A of FIG. 1.

As illustrated in FIGS. 1 and 2, a constant velocity universal joint 1 according to this embodiment includes, as main components, an outer joint member 10, an inner joint member 20, balls 30, and a cage 40. The constant velocity universal joint 1 includes a structure in which an inner component 50 including the inner joint member 20, the balls 30, and the cage 40 is housed so as to be capable of angular displacement with respect to the outer joint member 10.

The outer joint member 10 has a cup-like shape so as to open at one end and an inner spherical surface 14 equiangularly provided with a plurality of track grooves 12 extending in an axial direction. The inner joint member 20 has an outer spherical surface 24 equiangularly provided with a plurality of track grooves 22 extending in the axial direction in pairs with the track grooves 12 of the outer joint member 10. The balls 30 are interposed between the track grooves 12 of the outer joint member 10 and the track grooves 22 of the inner joint member 20 so as to transmit torque. The cage 40 is interposed between the inner spherical surface 14 of the outer joint member 10 and the outer spherical surface 24 of the inner joint member 20 so as to hold the balls 30.

The plurality of balls 30 are respectively housed in pockets 42 formed in the cage 40 and equiangularly arranged. In this embodiment, although six balls 30 are illustrated as an example, the number of balls 30 is arbitrary. Each of the ball tracks formed of the track grooves 12 of the outer joint member 10 and the track grooves 22 of the inner joint member 20 in cooperation with each other exhibits a wedge-like shape of increasing in diameter to an opening side of the outer joint member 10.

Note that, the outer joint member 10 includes a cup-shaped mouth portion 16 housing the inner component 50 including the inner joint member 20, the balls 30, and the cage 40, and a stem portion 18 extending in the axial direction integrally from a bottom portion of the mouth portion 16. The stem portion 18 has an outer peripheral surface provided with a spline 11 for coupling with respect to a wheel bearing 100 described later (refer to FIGS. 22 and 26). Further, the inner joint member 20 includes a shaft hole 26 provided with a spline 28 for coupling with respect to a shaft 60 (refer to FIGS. 12 and 17).

In the constant velocity universal joint 1, the track grooves 12 of the outer joint member 10 and the track grooves 22 of the inner joint member 20 are formed by cold-forging finishing. The components including the outer joint member 10, the inner joint member 20, the balls 30, and the cage 40 are assembled to each other based on simple matching in which the balls 30 and the cage 40 each having a rank corresponding to measured values of PCDs of the outer joint member 10 and the inner joint member 20, each of which has been arbitrarily selected, are selected with respect to the arbitrarily selected outer joint member 10 and the arbitrarily selected inner joint member 20.

The track grooves 12 of the outer joint member 10 and the track grooves 22 of the inner joint member 20 are formed by cold-forging finishing, and hence the track grooves 12 and 22 are formed only by cold-forging finishing. Thus, many conventional machine processes performed after cold forging can be omitted such as a trimming process and a grinding process. As a result, a yield increases, and hence cost of the constant velocity universal joint 1 can be reduced.

Meanwhile, assembly of the components based on the above-mentioned simple matching is performed by selection of the balls 30 and the cage 40 with respect to the outer joint member 10 and the inner joint member 20 which are respectively provided with the track grooves 12 and 22 formed by cold-forging finishing. Specifically, the simple matching is performed by the following procedure.

Figure 3:
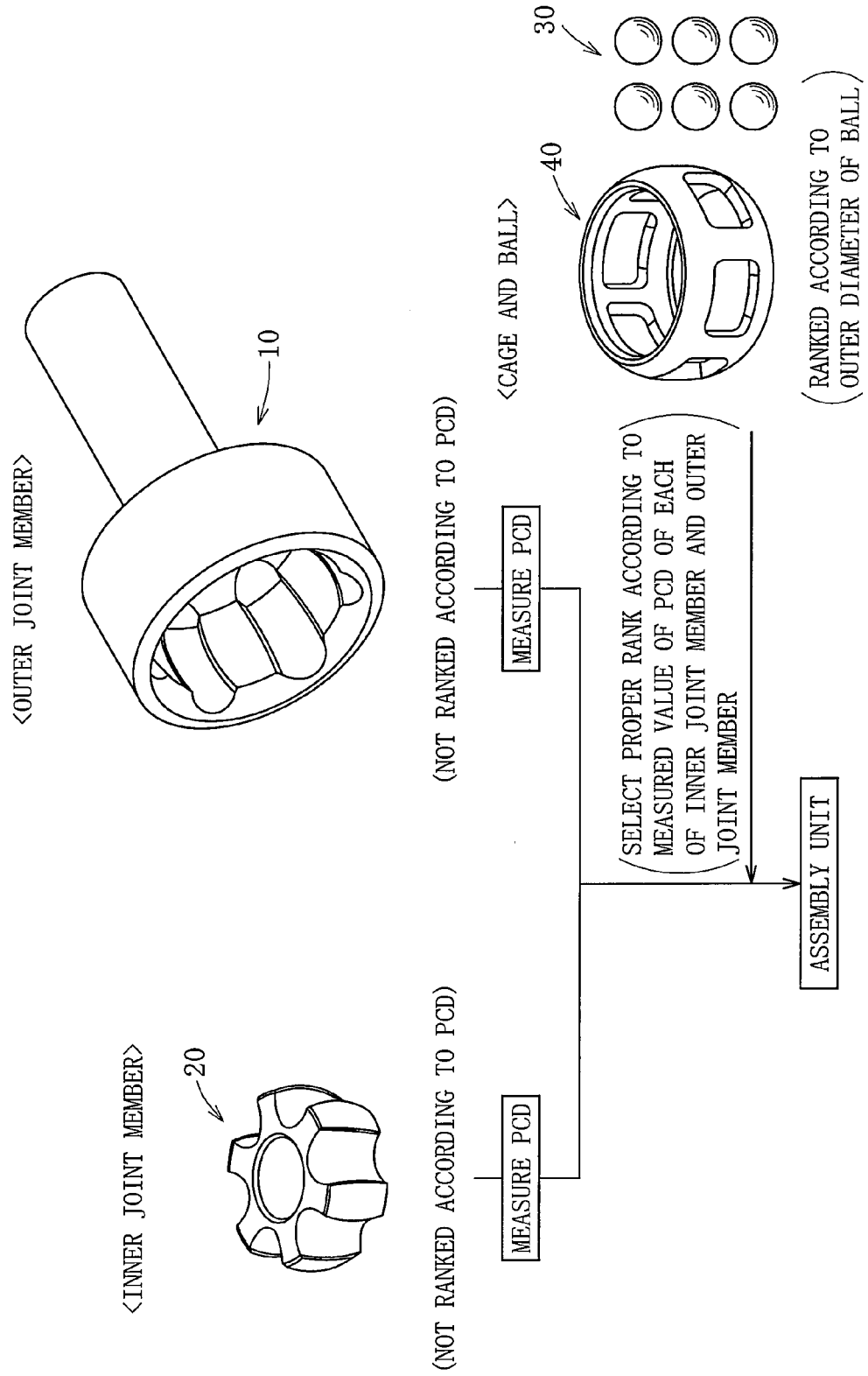
FIG. 3 A schematic structural view for illustrating a procedure of simple matching according to the embodiment of the present invention.

First, as illustrated in FIG. 3, without ranking of many outer joint members 10 and inner joint members 20 according to a PCD, cages 40 having pocket widths in conformity with outer diameters of the balls 30 are ranked according to the outer diameters of the balls. With regard to the ranking according to the outer diameters of the balls, the balls 30 and the cages 40 having the pocket widths in conformity with the outer diameters of the balls 30 are ranked into, for example, three ranks: "large"; "medium"; and "small". Then, PCDs of the arbitrarily selected outer joint member 10 and the arbitrarily selected inner joint member 20 are measured, and based thereon, the balls 30 and the cage 40 each having a rank corresponding to measured values of the PCDs of the arbitrarily selected outer joint member 10 and the arbitrarily selected inner joint member 20 are selected with respect to the arbitrarily selected outer joint member 10 and the arbitrarily selected inner joint member 20. For example, as a result of measurement of the PCDs of the arbitrarily selected outer joint member 10 and the arbitrarily selected inner joint member 20, when a PCD gap obtained from the measured values of the pitch circle diameters (PCDs) of the arbitrarily selected outer joint member 10 and the arbitrarily selected inner joint member 20 falls within a proper range, the balls 30 and the cage 40 of the "medium" rank are selected. When the PCD gap obtained from the measured values of the PCDs is larger than the proper range, the balls 30 and the cage 40 of the "large" rank are selected. When the PCD gap obtained from the measured values of the PCDs is smaller than the proper range, the balls 30 and the cage 40 of the "small" rank are selected. By such selections, the components including the outer joint member 10, the inner joint member 20, the balls 30, and the cage 40 are combined with each other. Note that, the number of ranks of the balls 30 and the cages 40 is not limited to three, and may be arbitrarily set as necessary.

As described above, the components including the outer joint member 10, the inner joint member 20, the balls 30, and the cage 40 are assembled to each other based on the simple matching in which the balls 30 and the cage 40 each having the rank corresponding to the measured values of the PCDs of the arbitrarily selected outer joint member 10 and the arbitrarily selected inner joint member 20 are selected with respect to the arbitrarily selected outer joint member 10 and the arbitrarily selected inner joint member 20. Thus, conventional matching (refer to FIG. 28) is not performed, in which all the components of outer joint members 210, inner joint members 220, balls 230, and cages 240 are ranked, and then the components including the outer joint members 210, the inner joint members 220, the balls 230, and the cages 240 are selected and combined with each other. As a result, the components can be assembled rapidly and easily, and hence a yield can be increased and workability can be enhanced. Therefore, cost of the constant velocity universal joint 1 is easily reduced.

In the constant velocity universal joint 1 assembled based on the simple matching in which the balls 30 and the cage 40 are selected with respect to the outer joint member 10 and the inner joint member 20, which are respectively provided with the track grooves 12 and 22 formed by cold-forging finishing, PCD gaps of the ball tracks formed of the track grooves 12 of the outer joint member 10 and the track grooves 22 of the inner joint member 20 in cooperation with each other are defined to range from 0 to +0.2 mm. Here, the "PCD (pitch circle diameter) gap" represents a difference between the PCD of the ball 30 in a state of being held in contact with the track groove 12 of the outer joint member 10 (outer-race PCD) and the PCD of the ball 30 in a state of being held in contact with the track groove 22 of the inner joint member (inner-race PCD).

By setting of the PCD gap within the range defined as described above, the components including the outer joint member 10, the inner joint member 20, the balls 30, and the cage 40 are combined with each other by the requisite-minimum simple matching. As a result, abnormal noise generated by backlash of the components can be suppressed to the requisite minimum, with operability of the constant velocity universal joint 1 being secured. Note that, when the PCD gap is smaller than 0 mm, it is difficult to secure the operability of the constant velocity universal joint 1. In contrast, when the PCD gap is larger than +0.2 mm, the backlash of the components increases, which leads to generation of abnormal noise.

Further, in the constant velocity universal joint 1 assembled based on the simple matching in which the balls 30 and the cage 40 are selected with respect to the outer joint member 10 and the inner joint member 20, which are respectively provided with the track grooves 12 and 22 formed by cold-forging finishing, a pocket gaps of the pockets 42 of the cage 40 housing the balls 30 are defined to range from −0.05 to 0 mm. The symbol "−" of the numerical value of the pocket gap represents an interference. Here, the "pocket gap" represents a difference between a width in the axial direction of the pocket 42 of the cage 40 (cage-pocket width) and the outer diameter of the ball 30 (ball diameter).

By setting of the pocket gap within the range defined as described above, the components including the outer joint member 10, the inner joint member 20, the balls 30, and the cage 40 are combined with each other by the requisite-minimum simple matching. As a result, abnormal noise generated by backlash of the components can be suppressed to the requisite minimum, with operability of the constant velocity universal joint 1 being secured. Note that, when the pocket gap in the cage 40 is smaller than −0.050 mm, the interference between the pocket 42 and the ball 30 becomes excessive, which leads to deterioration of durability of the constant velocity universal joint 1. When the pocket gap is equal to or more than 0 mm, backlash of the ball 30 occurs in the pocket 42, which leads to generation of abnormal noise.

Figure 4:
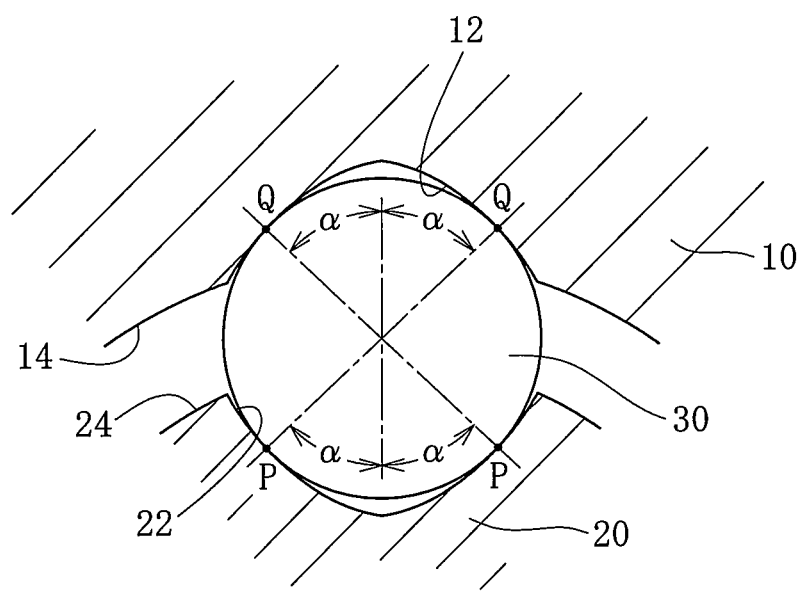
FIG. 4 A main-part enlarged sectional view illustrating a contact state of track grooves and a ball.

In the constant velocity universal joint 1 including the outer joint member 10 and the inner joint member 20, which are respectively provided with the track grooves 12 and 22 formed by cold-forging finishing, each of the track groove 12 of the outer joint member 10 and the track groove 22 of the inner joint member 20 has a lateral-sectional Gothic arch shape of being held in angular contact with the ball 30. For example, FIG. 4 illustrates the lateral sectional view of each of the track groove 12 of the outer joint member 10 and the track groove 22 of the inner joint member 20. Each of the track grooves 12 and 22 having the Gothic arch shapes respectively include two ball-contact points P and Q (ball-contact angle α) of coming in angular contact with the ball 30.

It is preferred that the ball-contact angle α formed at each of the two ball-contact points P and Q of coming in angular contact with the ball 30 range from 35 to 45°. By setting of the ball-contact angle α within the range defined as described above, a contact state of the ball 30 with respect to the track grooves 12 and 22 can be stabilized. Note that, when the ball-contact angle α is smaller than 35°, track-surface pressure becomes higher, which may lead to a risk of deterioration of durability. In contrast, when the ball-contact angle α is larger than 45°, margins allowing the ball to climb onto track shoulder portions at high operating angles decrease. As a result, at the time of high-torque application, the ball climbs onto the track shoulder portions while forming a contact ellipse, which may lead to a risk of chipping of the track shoulder portions, and the like.

Figure 5A:
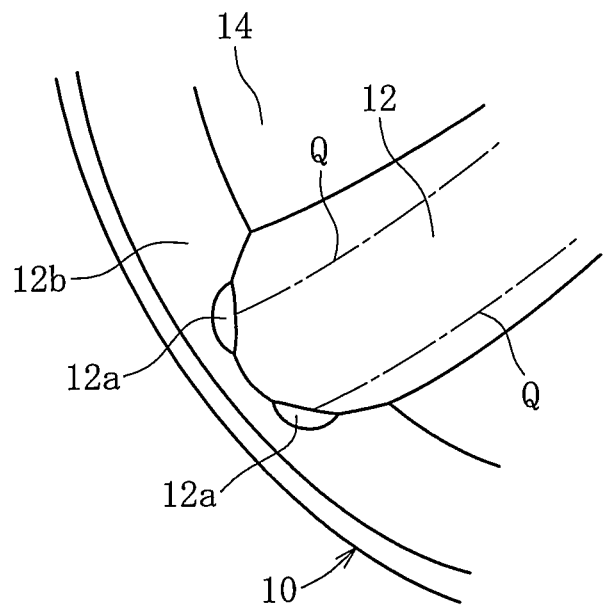
FIG. 5a A partially enlarged perspective view of an opening-end portion of an outer joint member, illustrating an example of cutout round portions.
Figure 6A:
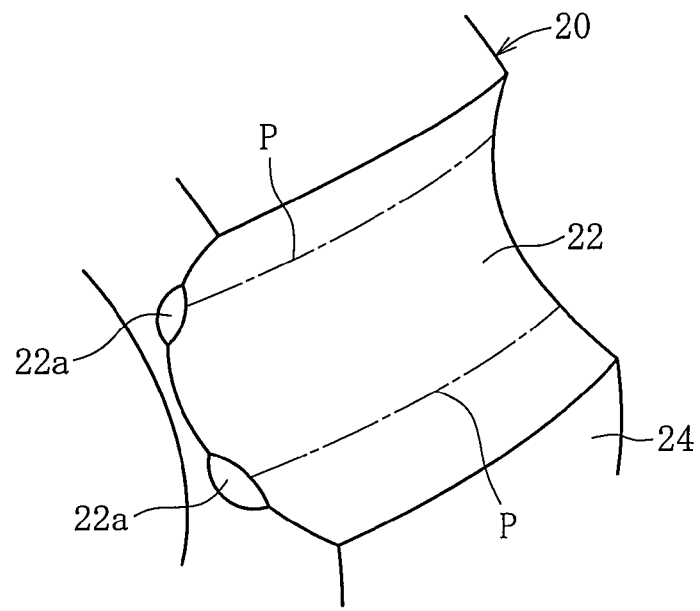
FIG. 6a A partially enlarged perspective view of an end portion of an inner joint member, illustrating an example of cutout round portions.

As illustrated in FIG. 5a, at an opening end of the track groove 12 of the outer joint member 10, there are provided cutout round portions 12a at parts corresponding to the ball-contact points. Further, as illustrated in FIG. 6a, at an opening end of the track groove 22 of the inner joint member 20, there are provided cutout round portions 22a at parts corresponding to the ball-contact points. At the parts corresponding to the ball-contact points, as described above, the track grooves 12 and 22 and the ball 30 come into angular contact with each other. Thus, as indicated by dashed lines in the figure, the two ball-contact points P and Q (illustrated as traces of the contact points in the figure) constitute parts of intersecting the opening ends of the track grooves 12 and 22.

Through provision described above of the cutout round portions 12a at the opening end of the track groove 12 of the outer joint member 10 and the cutout round portions 22a at the opening end of the track groove 22 of the inner joint member 20, at the time of operation of the constant velocity universal joint 1 at high angles, specifically, even when angles expected during use are exceeded for some reason so that the ball 30 comes to a position at an axial end portion of the track groove 12 of the outer joint member 10 or of the track groove 22 of the inner joint member 20, the cutout round portions 12a and 22a prevent the ball from biting into the axial end portion. Note that, the cutout round portions 12a and 22a may be formed not by cold-forging finishing but by a machining process such as lathing after cold forging and grinding finishing after heat treatment.

Further, when the cutout round portions 12a and 22a are formed by cold-forging finishing, it suffices that the track grooves 12 and the cutout round portions 12a of the outer joint member 10 and the track grooves 22 and the cutout round portions 22a of the inner joint member 20 are formed by simultaneous cold-forging finishing.

As described above, when the track grooves 12 and the cutout round portions 12a of the outer joint member 10 and the track grooves 22 and the cutout round portions 22a of the inner joint member 20 are formed by simultaneous cold-forging finishing, it is unnecessary to perform, after formation of the track grooves 12 and 22, a machining process such as lathing and grinding finishing after heat treatment. Thus, the track grooves 12 and 22 and the cutout round portions 12a and 22a are formed only by simultaneous cold-forging finishing, with the result that formation of the cutout round portions can be simplified, and cost of the constant velocity universal joint 1 can be reduced.

Figure 5B:
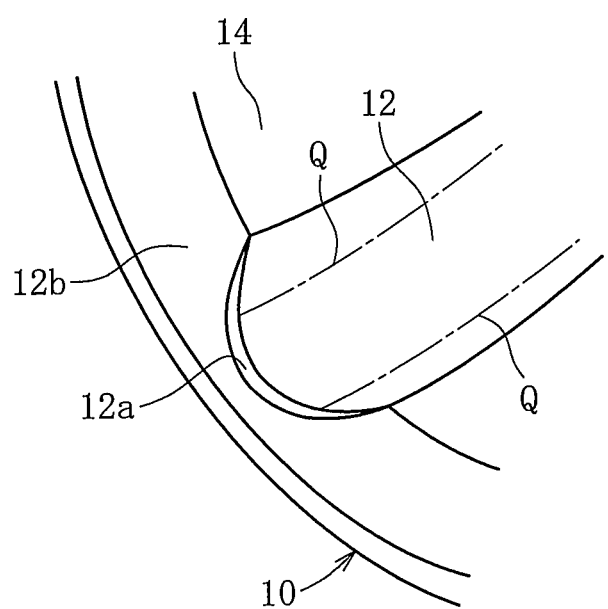
FIG. 5b A partially enlarged perspective view of the opening-end portion of the outer joint member, illustrating another example of the cutout round portion.
Figure 6B:
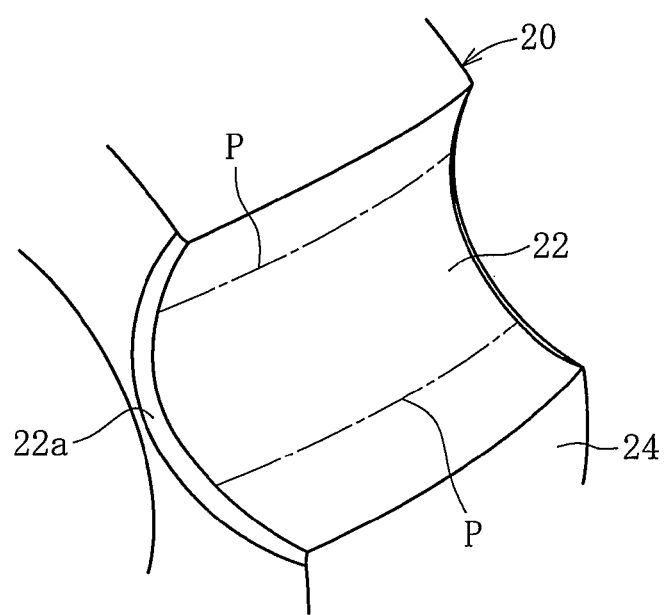
FIG. 6b A partially enlarged perspective view of the end portion of the inner joint member, illustrating another example of the cutout round portion.

Note that, although, in the case described above, the cutout round portions 12a and 22a are formed only at the parts corresponding to the ball-contact points at the opening end of the track groove 12 of the outer joint member 10 and the opening end of the track groove 22 of the inner joint member 20, as illustrated in FIGS. 5b and 6b, the cutout round portions 12a and 22a may be provided respectively over the opening end of the track groove 12 of the outer joint member 10 and over the opening end of the track groove 22 of the inner joint member 20. When the cutout round portions 12a and 22a are provided as described above respectively over the opening end of the track groove 12 of the outer joint member 10 and over the opening end of the track groove 22 of the inner joint member 20, the cutout round portions 12a and 22a constitute track-inlet chamfers described later.

Figure 7:
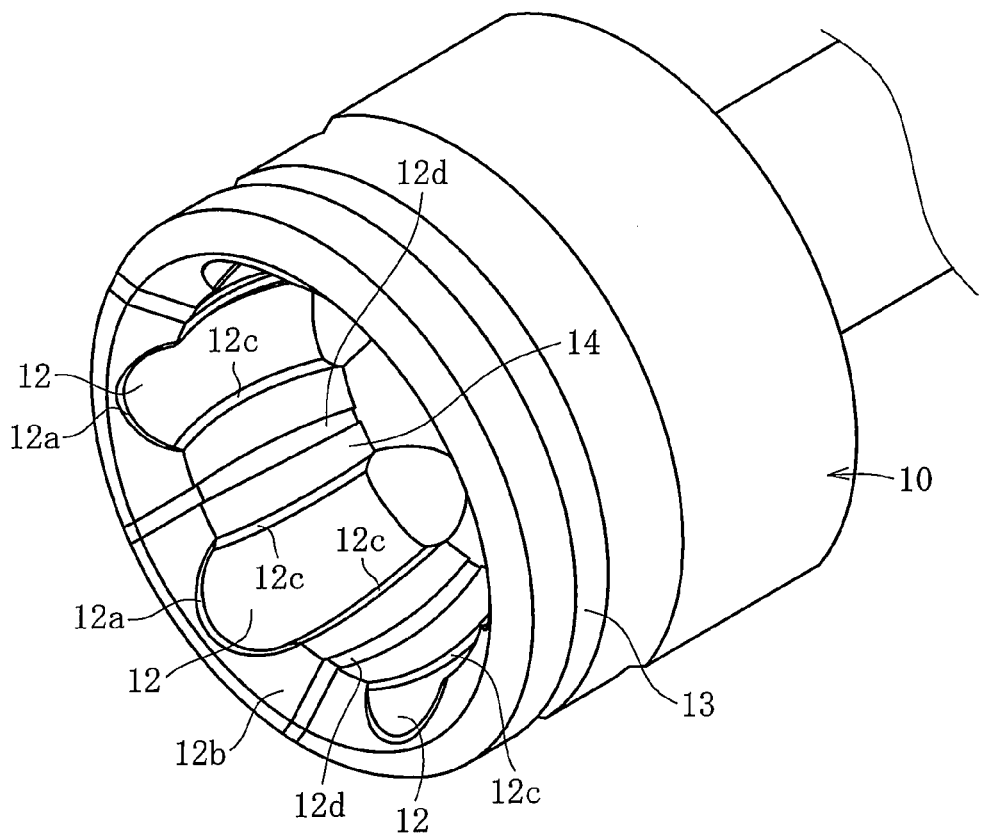
FIG. 7 A partially perspective view of the outer joint member provided with inlet chamfers, track chamfers, track-inlet chamfers, and slit grooves.
Figure 8:
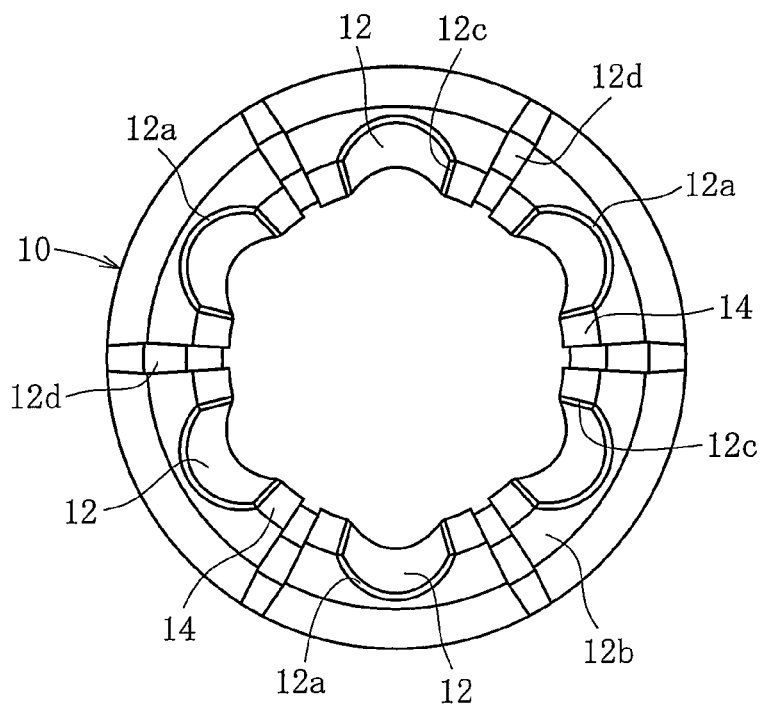
FIG. 8 A side view illustrating a state in which the outer joint member of FIG. 7 is viewed from an opening-end side thereof.

In the constant velocity universal joint 1 including the outer joint member 10 and the inner joint member 20 respectively provided with the track grooves 12 and 22 formed by cold-forging finishing, as illustrated in FIGS. 7 and 8, the following are formed by cold-forging finishing: inlet chamfers 12b formed along the entire opening periphery of the outer joint member 10; track chamfers 12c formed along boundary portions between the inner spherical surface 14 and the track grooves 12; and the track-inlet chamfers 12a formed along boundary portions between the track grooves 12 and the inlet chamfers 12b. Further, to an opening-end portion of the outer joint member 10, a boot made of a resin or rubber is mounted for the purpose of preventing leakage of grease filling an inside of the joint and intrusion of water and foreign matter from an outside of the joint. Meanwhile, parts except for a boot-attachment recessed groove 13 formed in an outer peripheral surface of the opening end of the outer joint member 10 are formed by cold-forging finishing.

As described above, the inlet chamfers 12b, the track chamfers 12c, and the track-inlet chamfers 12a of the outer joint member 10 are formed by cold-forging finishing, and hence the inlet chamfers 12b, the track chamfers 12c, and the track-inlet chamfers 12a are formed only by cold-forging finishing. Thus, many conventional machine processes performed after cold forging can be omitted such as a trimming process and a grinding process. As a result, a yield further increases, and hence cost of the constant velocity universal joint 1 can be further reduced. Further, the parts except for the boot-attachment recessed groove 13 formed in the outer peripheral surface of the outer joint member 10 are formed by cold-forging finishing, therefore the outer peripheral surface can be endowed with higher hardness, and torsional strength can be increased. In addition, work man-hours are reduced, and hence cost of the constant velocity universal joint 1 can be reduced.

Figures 9, 10:
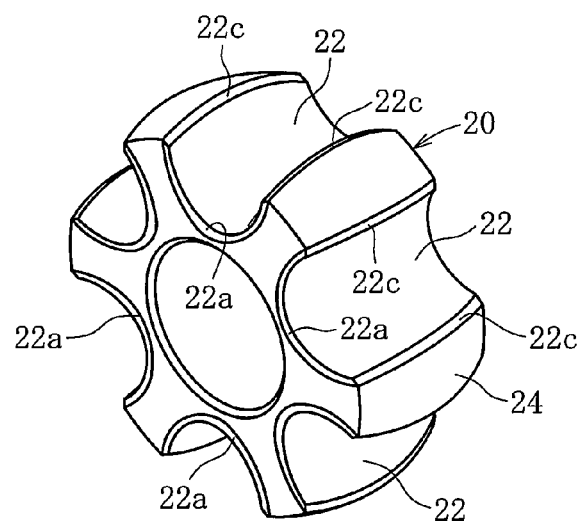
FIG. 9 A perspective view of the inner joint member provided with track chamfers and track-inlet chamfers.
FIG. 10 A table showing test results of crosswise operability, durability, and strength with regard to offset angles.

Further, in the constant velocity universal joint 1 including the outer joint member 10 and the inner joint member 20 respectively provided with the track grooves 12 and 22 formed by cold-forging finishing, as illustrated in FIG. 9, the following are formed by cold-forging finishing: track chamfers 22c formed along boundary portions between the outer spherical surface 24 and the track grooves 22 of the inner joint member 20; and the track-inlet chamfers 22a formed along boundary portions between both end surfaces of the inner joint member 20 and the track grooves 22.

As described above, the track chamfers 22c and the track-inlet chamfers 22a of the inner joint member 20 are formed by cold-forging finishing, and hence the track chamfers 22c and the track-inlet chamfers 22a are formed only by cold-forging finishing. Thus, many conventional machine processes performed after cold forging can be omitted such as a trimming process and a grinding process. As a result, a yield further increases, and hence cost of the constant velocity universal joint 1 can be further reduced.

When the track-inlet chamfers 12a of the outer joint member 10 are formed by cold-forging finishing, it suffices that the track grooves 12 and the track-inlet chamfers 12a of the outer joint member 10 are formed by simultaneous cold-forging finishing.

As described above, when the track grooves 12 and the track-inlet chamfers 12a of the outer joint member 10 are formed by simultaneous cold-forging finishing, it is unnecessary to perform, after formation of the track grooves 12, a machining process such as lathing and grinding finishing after heat treatment. Thus, the track grooves 12 and the track-inlet chamfers 12a are formed only by simultaneous cold-forging finishing, with the result that formation of the track-inlet chamfers can be simplified, and cost of the constant velocity universal joint 1 can be reduced.

The track chamfers 12c formed along the boundary portions between the inner spherical surface 14 and the track grooves 12 of the outer joint member 10 and track chamfers 22c formed along boundary portions between the outer spherical surface 24 and the track grooves 22 of the inner joint member 20 each exhibit a round shape as illustrated in FIG. 2 in an enlarged manner. The round shapes of each of the track chamfers 12c and 22c are formed successively to provide smooth continuation respectively between the track grooves 12 and the inner spherical surface 14 and between the track grooves 22 and the outer spherical surface 24.

As described above, when the track chamfers 12c formed along the boundary portions between the inner spherical surface 14 and the track grooves 12 of the outer joint member 10 and the track chamfers 22c formed along the boundary portions between the outer spherical surface 24 and the track grooves 22 of the inner joint member 20 are each formed in the round shape, stress concentration thereat can be avoided. Note that, the track chamfers 12c and 22c may be formed not by cold-forging finishing but by a machining process such as lathing after cold forging and grinding finishing after heat treatment.

When the track chamfers 12c and 22c are formed by cold-forging finishing, it suffices that the track grooves 12 and the track chamfers 12c of the outer joint member 10 and the track grooves 22 and the track chamfers 22c of the inner joint member 20 are formed by simultaneous cold-forging finishing.

As described above, when the track grooves 12 and the track chamfers 12c of the outer joint member 10 and the track grooves 22 and the track chamfers 22c of the inner joint member 20 are formed by simultaneous cold-forging finishing, it is unnecessary to perform, after formation of the track grooves 12 and 22, a machining process such as lathing and grinding finishing after heat treatment. Thus, the track grooves 12 and 22 and the track chamfers 12c and 22c are formed only by simultaneous cold-forging finishing, with the result that formation of the track chamfers can be simplified, and cost of the constant velocity universal joint 1 can be reduced.

In the constant velocity universal joint 1, as illustrated in FIGS. 7 and 8, slit grooves 12d are formed in the axial direction between the track grooves 12 adjacent to each other in a circumferential direction along the inner spherical surface 14 of the outer joint member 10. The slit grooves 12d are formed to reach the inner spherical surface 14 from an opening-end surface of the outer joint member 10 via the inlet chamfers 12b. Note that, although six slit grooves 12d are illustrated as an example in this embodiment, the number of the slit grooves 12d is arbitrary. In this case, a width dimension of each of the slit grooves 12d is set to range from 5% to 30% of a maximum width dimension of the inner spherical surface 14 between the track grooves 12 adjacent to each other in the circumferential direction.

As described above, when the slit grooves 12d extending in the axial direction are formed between the track grooves 12 adjacent to each other in the circumferential direction along the inner spherical surface 14 of the outer joint member 10, at the time of cold forging, extruded portions of a raw material of the outer joint member 10 do not intrude into gaps of a molding die for cold forging. Thus, the inner spherical surface 14 can be formed with desired shape accuracy. In particular, when the width dimension of each of the slit grooves 12d is set to range from 5% to 30%, it is easy to demold the outer joint member 10 from the molding die at the time of cold forging. In addition, an area required for the inner spherical surface 14 of the outer joint member 10 can be secured, and hence required strength and durability can be secured. Note that, when the width dimension of each of the slit grooves 12d is smaller than 5%, it is difficult to demold the outer joint member 10 from the molding die at the time of cold forging. Meanwhile, when the width dimension of each of the slit grooves 12d is larger than 30%, it is difficult to secure the area required for the inner spherical surface 14 of the outer joint member 10, which leads to reduction of strength and deterioration of durability.

In the constant velocity universal joint 1, as illustrated in FIG. 1, a curvature center $O_2$ of the track groove 12 of the outer joint member 10 and a curvature center $O_2$ of the track groove 22 of the inner joint member 20 are offset to each other in the axial direction with respect to a joint center O by equal distances F onto opposite sides (the curvature center $O_1$ of the track groove 12 is offset on an opening side of the joint, and the curvature center $O_2$ of the track groove 22 is offset on an inner-portion side of the joint). Thus, the ball track exhibits the wedge-like shape of being wide on the opening side and gradually narrowed to the inner-portion side.

Further, both a curvature center of an outer spherical surface 44 of the cage 40 and a curvature center of the inner spherical surface 14 of the outer joint member 10 correspond to the joint center O, the inner spherical surface 14 being held in sliding contact with the outer spherical surface 44. Still further, both a curvature center of an inner spherical surface 46 of the cage 40 and a curvature center of the outer spherical surface 24 of the inner joint member 20 also correspond to the joint center O, the outer spherical surface 24 being held in sliding contact with the inner spherical surface 46. When the outer joint member 10 and the inner joint member 20 undergo angular displacement with respect to each other, the balls 30 held by the cage 40 are constantly maintained, at any operating angle, within planes obtained by bisection of the operating angle. As a result, a constant velocity property of the joint is secured.

In the constant velocity universal joint 1, as illustrated in FIG. 1, an angle which the curvature center $O_1$ of the track groove 12 of the outer joint member 10 and the curvature center $O_2$ of the track groove 22 of the inner joint member 20 form together with respect to a ball center $O_3$, in other words, an offset angle $\phi$ is set to range from 11.0° to 15.0°. The offset angle $\phi$ is lower than offset angles of conventional products (approximately 16.0°). Thus, depths of the track grooves 12 and 22 approximate to be uniform in the axial direction in comparison with those of conventional products.

In this case, the track grooves 12 and 22 are deeper at shallow parts than those of the conventional products. Thus, even under high load, the balls 30 are less liable to climb onto the shoulder portions of the track grooves 12 and 22 while forming contact ellipses, and hence chipping of the shoulder portions and the like are prevented. As a result, the track grooves 12 and 22 can be endowed with higher strength and durability. Further, a thickness of the cage 40 can be increased, and hence the cage 40 can be endowed with higher strength and prolonged life. Still further, as described above, when the offset angle $\phi$ falls within the above-mentioned range, operability can be satisfactorily maintained.

As a result, the respective track grooves 12 and 22 of the outer joint member 10 and the inner joint member 20 can be endowed with higher strength and durability. Thus, the track grooves 12 of the outer joint member 10 and the track grooves 22 of the inner joint member 20 are easily formed by cold-forging finishing. Further, a jumping-out force of the ball 30 with respect to the joint-opening side (axial force) is weakened in comparison with that of the conventional products, and hence generation of slapping noise owing to the axial force of the ball 30 can be suppressed.

Meanwhile, when the offset angle φ is excessively low, there is a risk that durability is deteriorated and strength decreases or problems with operability arise.

Through tests for comparison of the crosswise operability, the durability, and quasi-static torsional strength, the applicants of the present invention confirmed whether or not the range of the offset angle φ defined as described above was optimum. The crosswise operability was evaluated based on presence or absence of clicking at the time when the shaft was bent up to a maximum operating angle in a plane including opposed ball tracks and then the shaft was similarly bent in a plane perpendicular to the plane described above. Further, the durability was evaluated under the following conditions: load torque: 834 N·m (85 kgf·m); number of rotations: 230 rpm; and operating angle: 6°. The quasi-static torsional strength was evaluated under the following conditions: operating angle: 40°; number of rotations: 2.5 rpm; and increase rate of load torque: 0.05 kN·m/rev. FIG. 10 shows results of the tests. Note that, the symbols and meanings thereof in FIG. 10 are as follows: x: problematic; Δ: poor; ○: normal; and ⊚: good (the same applies to description hereinbelow).

From FIG. 10, it can be understood that, when the offset angle φ is smaller than 11.0°, there are problems in all the following aspects: crosswise operability; durability; and quasi-static torsional strength, and that, when the offset angle φ is larger than 15.0°, the constant velocity universal joint 1 is poor in durability and strength. Accordingly, in order to satisfy all the operability, durability, and strength of the constant velocity universal joint 1, it is suitable to set the offset angle φ to range from 11.0° to 15.0°.

Figure 11:
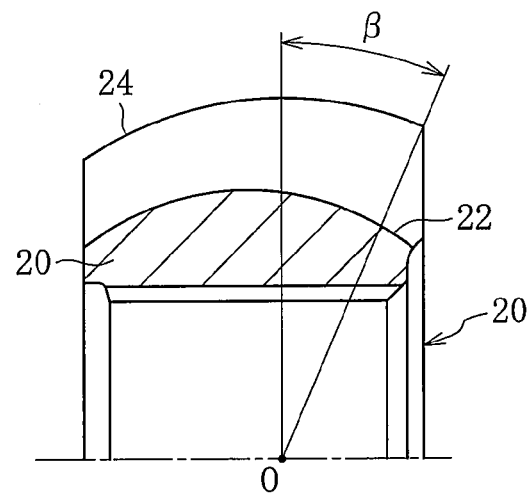
FIG. 11 A partial sectional view of the inner joint member, illustrating a spherical angle.

The inner joint member 20 in the constant velocity universal joint 1 forms, as illustrated in FIG. 11, a spherical angle β equal to or more than 12.5° at a position on a joint-opening side of the outer spherical surface 24. Here, the spherical angle β is an axial angle formed by a joint-opening-side end portion of the outer spherical surface 24 with respect to the curvature center of the outer spherical surface 24 of the inner joint member 20 (joint center O). The spherical angle β is set to be equal to or more than 12.5° for the following reason.

Figure 12:
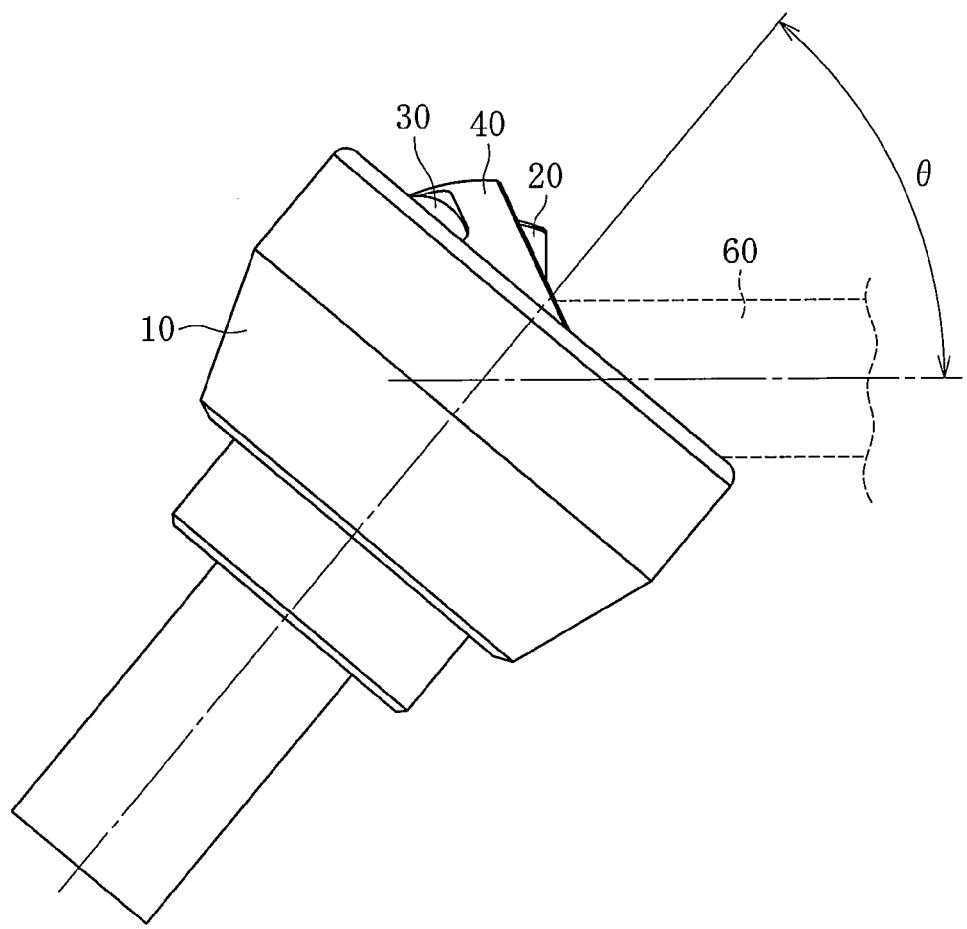
FIG. 12 A front view of the joint in a state of forming a maximum operating angle, illustrating the spherical angle.
Figure 13:
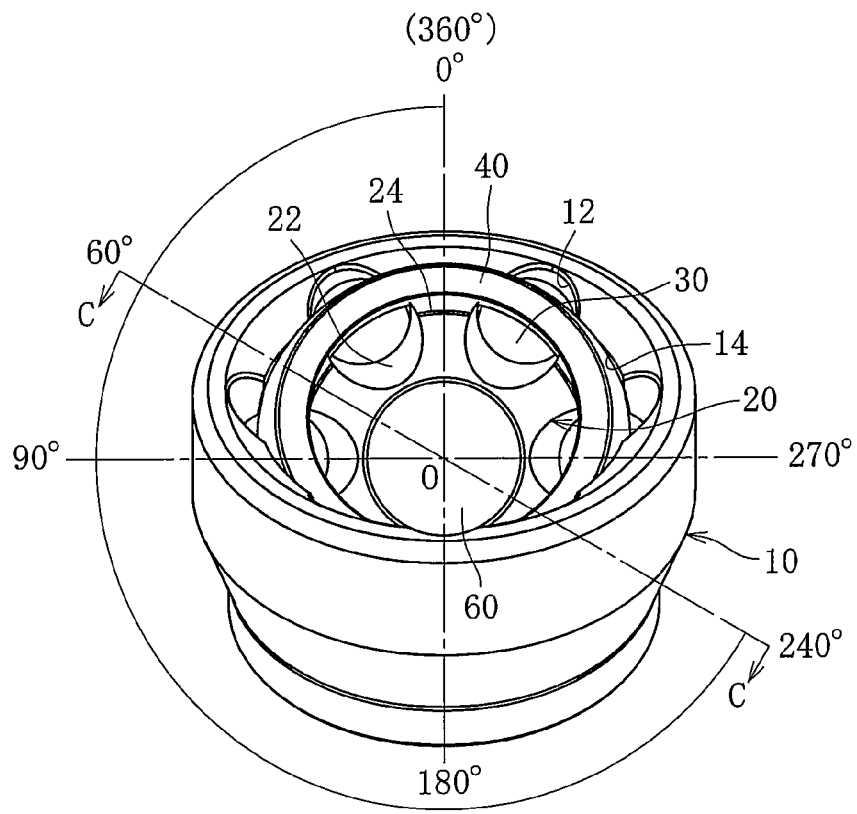
FIG. 13 A right-side view of FIG. 12.

FIGS. 12 and 13 each illustrate a state in which the shaft 60 (broken lines in FIG. 12) as a drive shaft spline-fitted to the inner joint member 20 forms a maximum operating angle θ. When torque is applied to the shaft 60, spherical forces are generated between the inner joint member 20 and the cage 40 and between the cage 40 and the outer joint member 10. With regard to the spherical force which acts between the inner joint member 20 and the cage 40 at the maximum operating angle, under a state in which the shaft 60 forms the maximum operating angle θ at a phase angle between 0° and 360° (refer to FIG. 13) in a direction of a phase angle of 180°, a large spherical force is generated particularly at a phase angle between 240° and 340°. The spherical force, which has been zero, is rapidly generated approximately at a phase angle of 240°.

Figure 14:
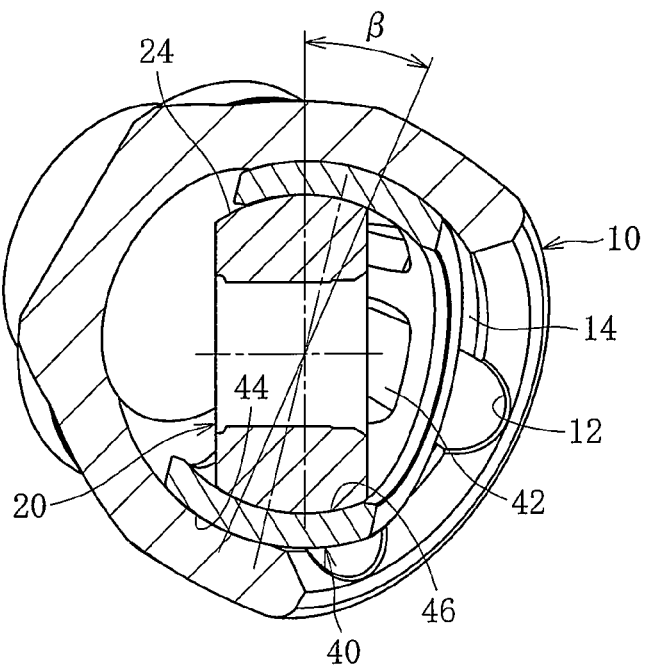
FIG. 14 A sectional perspective view taken along the line C-O-C of FIG. 13.

In this context, with a focus on a contact state of the inner joint member 20 and the cage 40 in a state of the phase angle of 240° when the constant velocity universal joint 1 forms the maximum operating angle θ, FIG. 14 illustrates the contact state of the inner joint member 20 and the cage 40. FIG. 14 is a sectional view taken along the line C-O-C of FIG. 13, in which a side of the phase angle of 240° of FIG. 13 is on an upper side and a side of the phase angle of 60° of FIG. 13 is on a lower side.

As illustrated in FIG. 14, under the state in which the shaft 60 forms the maximum operating angle θ in the direction of the phase angle of 180°, on the side of the phase angle of 240° of FIG. 13, the joint-opening-side end portion of the outer spherical surface 24 of the inner joint member 20 is held in contact on an inner side with respect to the curvature center of the inner spherical surface 46 of the cage 40. In this state, the spherical force from the inner joint member 20 is received only on the inner side of the inner spherical surface 46 of the cage 40. When the shaft 60 is further rotated in this state, the inner joint member 20 is rotated by the spherical force described above in a direction of biting into the inner spherical surface 46 of the cage 40. Thus, excessive load is applied to the cage 40, and hence there is a risk that the cage 40 is exposed to excessive stress at high operating angles and at the time of high-torque application.

As a countermeasure for the excessive load onto the cage 40, the spherical angle β equal to or more than 12.5° is formed at the position on the joint-opening side of the outer spherical surface 24 of the inner joint member 20 (refer to FIG. 11). At high operating angles and at the time of high-torque application, even when a large spherical force acts from the joint-opening side of the outer spherical surface 24 of the inner joint member 20 onto the inner spherical surface 46 of the cage 40, the joint-opening-side end portion of the outer spherical surface 24 of the inner joint member 20 reliably comes into contact with an inlet side of the inner spherical surface 46 of the cage 40. As a result, a contact area can be sufficiently secured so that the above-mentioned spherical force can be born.

By securing of the contact area, a phenomenon can be reduced, in which the joint-opening-side end portion of the outer spherical surface 24 of the inner joint member 20 bites into the inner spherical surface 46 of the cage 40. As a result, the cage 40 is allowed to avoid application with excessive load, and hence smooth rotation can be secured.

As described above, excessive load onto the cage 40 can be reduced by securing of the contact area. Thus, it is possible to secure cage strength with which the large spherical force acting from the outer spherical surface 24 of the inner joint member 20 onto the inner spherical surface 46 of the cage 40 can be born. As a result, it is possible to provide the constant velocity universal joint 1 which is smoothly rotated, and has excellent operability, high reliability, and a prolonged life.

Note that, when the spherical angle β formed at the position on the joint-opening side of the outer spherical surface 24 of the inner joint member 20 is smaller than 12.5°, it is difficult to sufficiently secure, against the spherical force which acts from the inner joint member 20 onto the cage 40, the contact area of the inner joint member 20 with respect to the cage 40. As a result, it is difficult to reduce excessive load onto the cage 40 and to secure cage strength, which leads to a risk that the constant velocity universal joint 1 cannot be smoothly rotated.

For compactification of the constant velocity universal joint 1, for example, it is necessary to secure strength of the inner joint member 20 at high operating angles. In this context, FIG. 15 illustrates the inner joint member 20 as a component constituting the constant velocity universal joint 1, in which a lower half with respect to a center line illustrates the inner joint member 20 of a product of the present invention and an upper half with respect to the center line illustrates the inner joint member 220 as a conventional product for comparison with the product of the present invention.

In the constant velocity universal joint 1 in this embodiment, a step portion 25 is provided in the axial direction between a joint-opening-side end surface 23 of the inner joint member 20 and a spline end portion 28a of the shaft hole 26 so that a recessed end surface 27 is formed at a position on the inner side with respect to the joint-opening-side end surface 23. The joint-opening-side end surface 23 of the inner joint member 20 and the spline end portion 28a of the shaft hole 26 are positioned on an insertion side of the shaft 60 to be press-fit to the shaft hole 26 of the inner joint member 20, that is, the opening side of the outer joint member 10.

Figure 15:
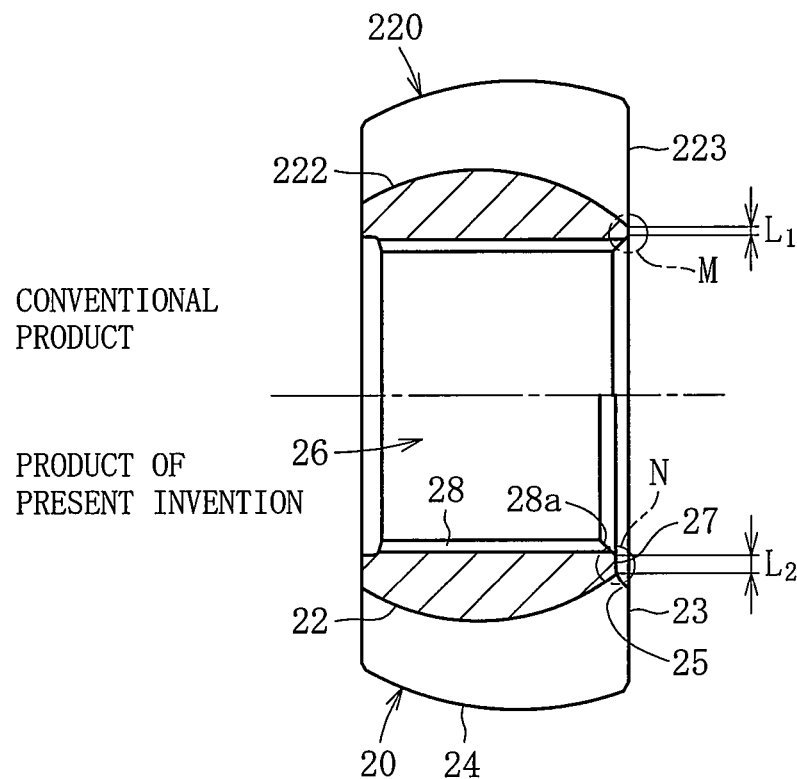
FIG. 15 A sectional view in which a lower half with respect to a center line illustrates the inner joint member of a product of the present invention and an upper half with respect to the center line illustrates an inner joint member of a conventional product.

When a thickness of the inner joint member 20 is reduced for weight reduction and compactification of the constant velocity universal joint 1, as illustrated in FIG. 15, as for the conventional product, a thickness is reduced in a bottom portion of a track groove 222 in a joint-opening-side end surface 223 of the inner joint member 220 (radial dimension $L_1$ of a M portion). In contrast, as for the product of the present invention, the step portion 25 is provided in the axial direction between the joint-opening-side end surface 23 of the inner joint member 20 and the spline end portion 28a of the shaft hole 26 so that the recessed end surface 27 is formed at the position on the inner side with respect to the joint-opening-side end surface 23. Thus, a thickness of a bottom portion of the track groove 22 in the recessed end surface 27 (radial dimension $L_2$ of an N portion) can be increased in comparison with that of the conventional product (radial dimension $L_1$ of the M portion) ($L_2 > L_1$).

As described above, the thickness of the recessed end surface 27 of the inner joint member 20 is increased in comparison with that of the conventional product. Thus, even at high operating angles and at the time of high-torque application, strength of the inner joint member 20 can be sufficiently secured. As a result, the constant velocity universal joint 1 is weight-reduced and compactified, and the inner joint member 20 is endowed with higher strength.

The radial dimension $L_2$ of the recessed end surface 27 positioned on the inner side with respect to the joint-opening-side end surface 23 of the inner joint member 20 is set to be equal to or more than 1 mm. When the radial dimension $L_2$ of the recessed end surface 27 is smaller than 1 mm, stress concentration is liable to occur in the recessed end surface 27 at high operating angles and at the time of high-torque application. As a result, it is difficult to sufficiently secure strength of the inner joint member 20.

Figure 16:
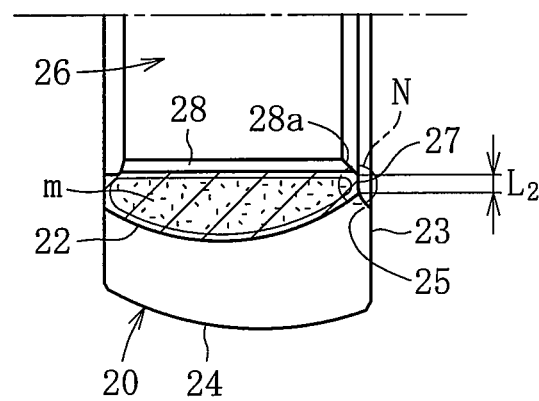
FIG. 16 A partial sectional view illustrating a mode in which an uncured-layer part exists in the end portion of the inner joint member, the end portion being provided with a recessed end surface.

Note that, on the outer spherical surface 24 and the end surface of the inner joint member 20 and on an inner peripheral surface of the shaft hole 26, normally, there are formed surface-cured layers (not shown) by heat treatment such as carburizing-and-quenching for the purpose of securing strength of the inner joint member 20. As illustrated in FIG. 16, when the radial dimension $L_2$ of the recessed end surface 27 is set to be equal to or more than 1.5 mm, an uncured-layer part m is left in the joint-opening-side end portion of the inner joint member 20, the joint-opening-side end portion being formed at the recessed end surface 27. Thus, strength of the inner joint member 20 can be sufficiently and stably secured at high operating angles and at the time of high-torque application.

Figure 17:
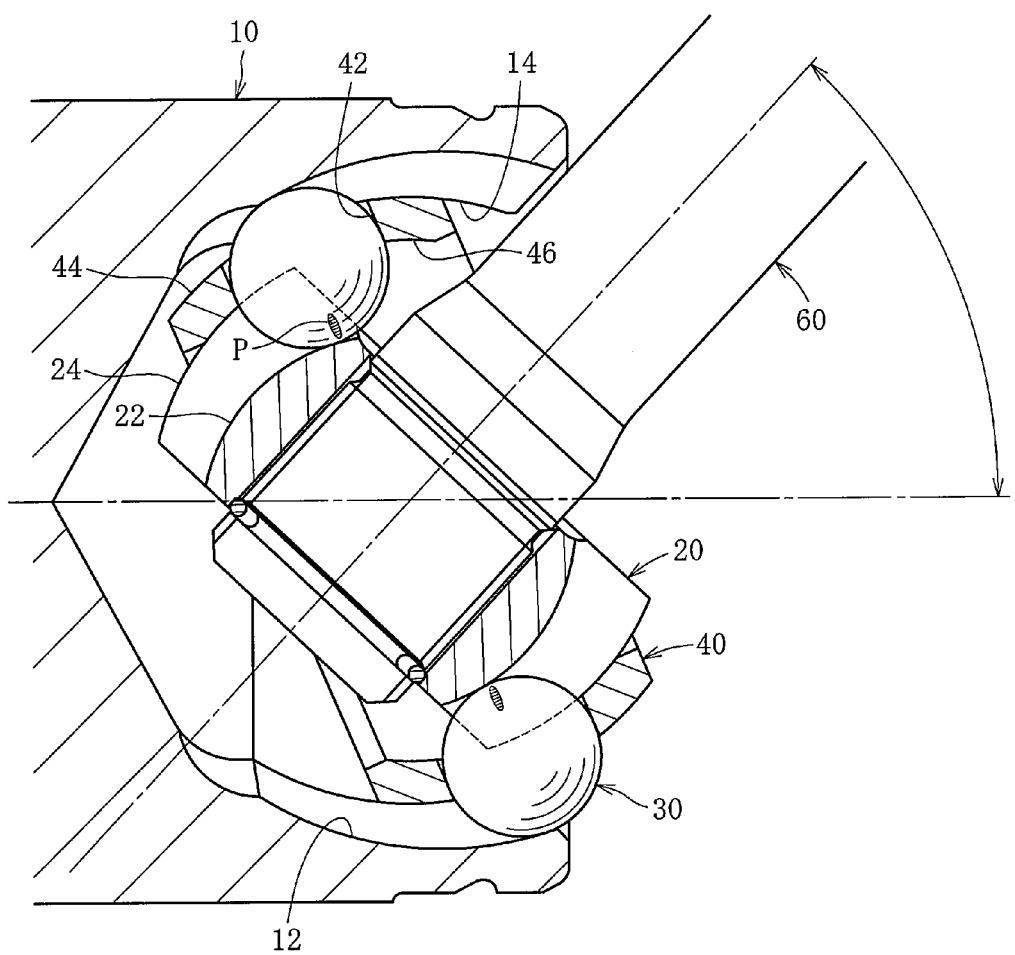
FIG. 17 A sectional view illustrating a state in which the constant velocity universal joint of the present invention forms a high operating angle.

The recessed end surface 27 positioned on the inner side with respect to the joint-opening-side end surface 23 of the inner joint member 20 is formed at a part corresponding to the bottom portion of the track groove 22. With this, as illustrated in FIG. 17, when the constant velocity universal joint 1 forms a high operating angle, a ball-contact point P, in other words, the contact ellipse formed at the time when the ball 30 is held in contact with the track groove 22 of the inner joint member 20 does not get out of the track groove 22. Thus, torque is efficiently and reliably transmitted. Note that, the ball 30 described above represents a ball 30 positioned at an innermost portion of the track groove 12 of the outer joint member 10 (inlet-nearest portion of the track groove 22 of the inner joint member 20).

Figure 18:
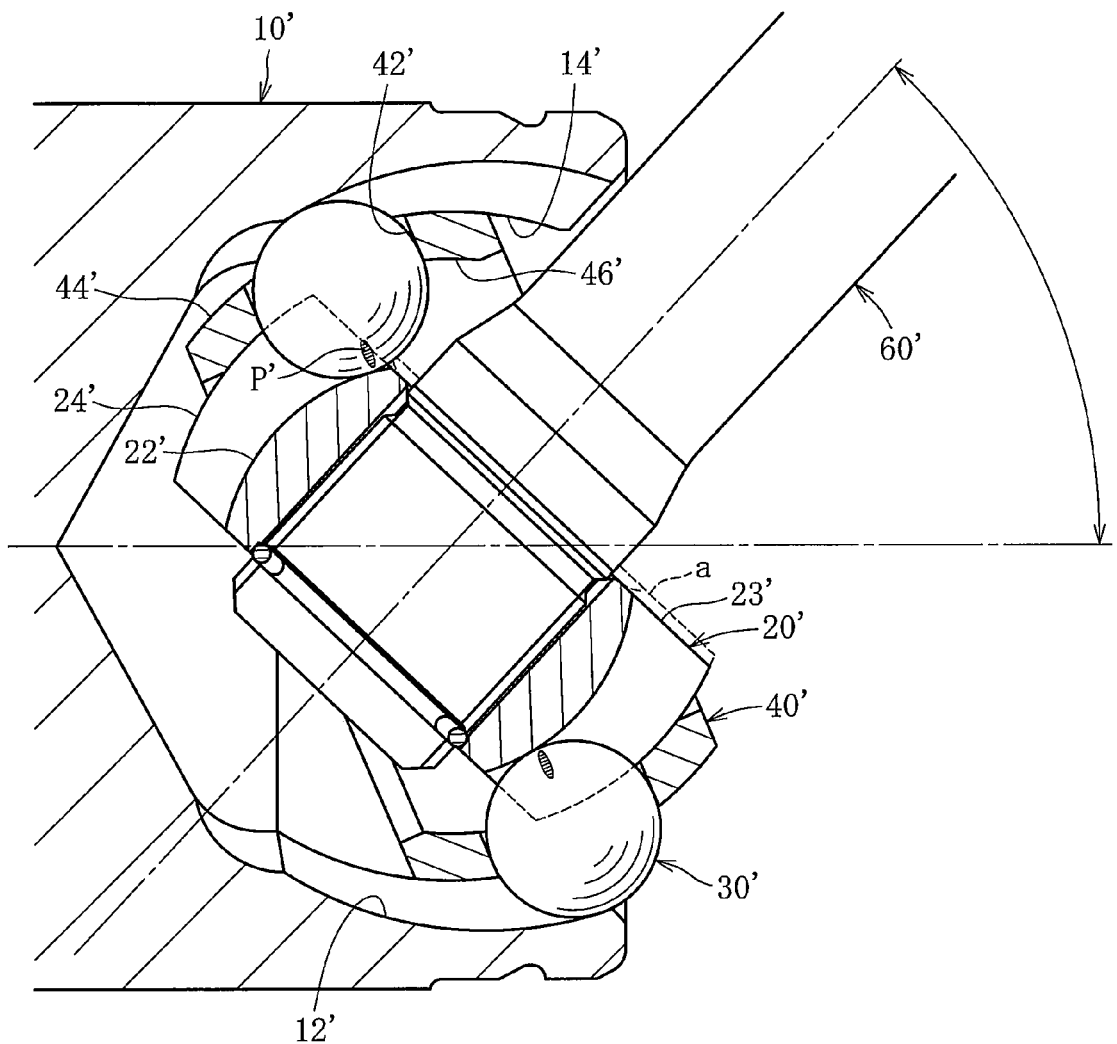
FIG. 18 A sectional view illustrating a state in which a constant velocity universal joint including an inner joint member having a width merely reduced in an axial direction for the sake of comparison with FIG. 17 forms a high operating angle.

Note that, in contrast, FIG. 18 illustrates a comparison example with respect to FIG. 17. In FIG. 18, the parts same as those in FIG. 17 are denoted by the same reference symbols with dashes, and redundant description thereof is omitted. As illustrated in FIG. 18, when a radially outer part with respect to a recessed end surface formed at a part corresponding to a bottom portion of a track groove 22' (dotted-line part a in the figure) is cut off, in other words, when an axial width of an inner joint member 20' is merely reduced, a thickness of a joint-opening-side end surface 23' of the inner joint member 20' can be secured.

However, in this case, a swelling part (dotted-line part in the figure) is cut off, which swells from a bottom portion in the track groove 22' while being positioned on the radially outer part with respect to the recessed end surface described above. Thus, a ball-contact point P' gets out of the track groove 22' of the inner joint member 20'.

Accordingly, as illustrated in FIG. 18, even when the axial width of the inner joint member 20' is merely reduced so that the thickness of the joint-opening-side end surface 23' of the inner joint member 20' is secured, the ball-contact point P' gets out of the track groove 22' of the inner joint member 20'. Thus, torque is inefficiently transmitted, and hence it is difficult to satisfactorily perform function of the constant velocity universal joint.

From those facts, it is effective to form, as illustrated in FIGS. 15 and 16, the recessed end surface 27 at the part corresponding to the bottom portion of the track groove 22, the recessed end surface 27 being positioned on the inner side with respect to the joint-opening-side end surface 23 of the inner joint member 20.

Figure 19:
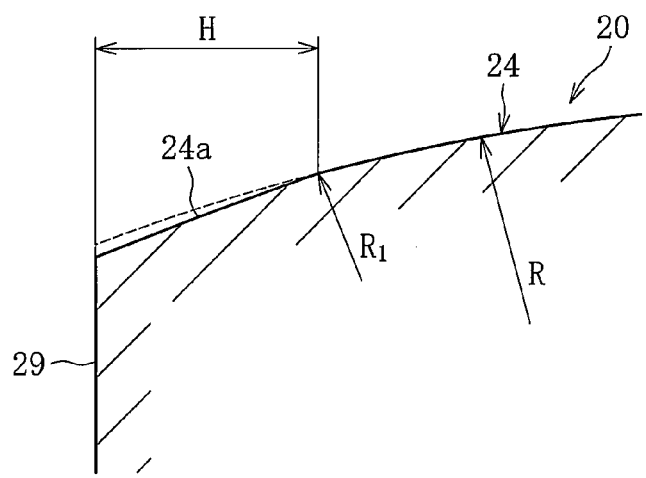
FIG. 19 A main-part enlarged sectional view of the inner joint member provided with a tapered relief portion.

In the constant velocity universal joint 1, at a joint-inner-side end portion of the outer spherical surface 24 of the inner joint member 20, as illustrated in FIG. 19, there is formed a tapered relief portion 24a retracted with respect to the outer spherical surface 24 having a curvature radius R. The tapered relief portion 24a has a curvature radius $R_1$ set to be smaller than the curvature radius R of the outer spherical surface 24 so as to be smoothly continuous with the outer spherical surface 24. Thus, the tapered relief portion 24a is retracted to a radially inner side with respect to an inner-side end portion of a case where the relief portion 24a is not provided (range illustrated by an imaginary line of FIG. 19). Further, it is preferred to set a range H of the relief portion 24a (range from a joint-inner-side end surface 29 of the inner joint member 20 to an intersection of the tapered relief portion 24a and the outer spherical surface 24) to be equal to or smaller than 3 mm.

Through provision of the relief portion 24a at the joint-inner-side end portion of the outer spherical surface 24 of the inner joint member 20 as described above, the inner spherical surface 46 of the cage 40 is free from being bitten by the joint-inner-side end portion of the inner joint member 20, which enables smooth rotation. As a result, excessive load onto the cage 40 can be reduced, and the cage 40 can be endowed with higher strength.

By setting of the range H of the relief portion 24a to be equal to or smaller than 3 mm from the joint-inner-side end surface 29 of the inner joint member 20, the contact area of the inner joint member 20 and the cage 40 can be effectively secured. As a result, surface pressure between the inner joint member 20 and the cage 40 and heat generation can be suppressed, which leads to prolongation of a life. When the relief portion 24a is excessively large, the contact area of the inner joint member 20 and the cage 40 is reduced. As a result, the surface pressure between the inner joint member 20 and the cage 40 becomes higher and heat generation is promoted, which may lead to a risk of shortening of the life of the constant velocity universal joint 1. Note that, when the relief portion 24a is excessively small, a function of the relief portion 24a cannot be exerted. Thus, it is preferred to set the range H of the relief portion 24a to be equal to or more than 0.5 mm.

Figure 20:
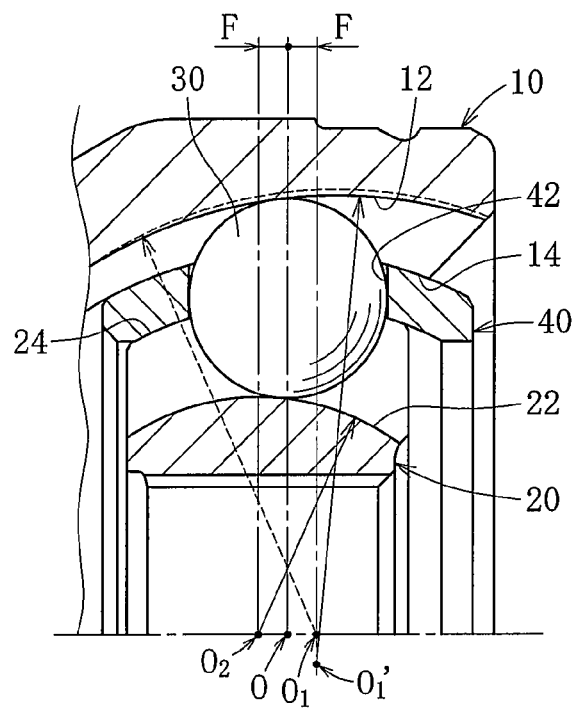
FIG. 20 A partial sectional view of the constant velocity universal joint in which a curvature center of the track groove of the outer joint member is shifted in a radial direction to such a position as to have a radius larger than a radius formed at a position on a joint axis.
Figure 21:
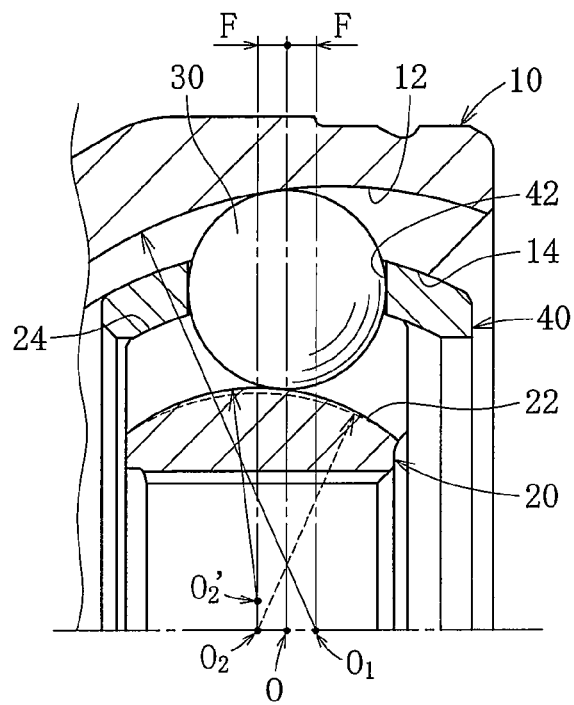
FIG. 21 A partial sectional view of the constant velocity universal joint in which a curvature center of the track groove of the inner joint member is shifted in the radial direction to such a position as to have a radius smaller than a radius formed at a position on the joint axis.

A curvature center $O_1'$ of the track groove 12 of the outer joint member 10 in the constant velocity universal joint 1 is shifted as illustrated in FIG. 20 in the radial direction to such a position as to have a radius larger than a radius formed at the position on a joint axis. Further, a curvature center $O_2'$ of the track groove 22 of the inner joint member 20 is shifted as illustrated in FIG. 21 in the radial direction to such a position as to have a radius smaller than the radius formed at the position on the joint axis.

As described above, when the curvature center $O_1'$ of the track groove 12 of the outer joint member 10 is shifted in the radial direction to such a position as to have the radius larger than the radius formed at the position on the joint axis, or when the curvature center $O_2'$ of the track groove 22 of the inner joint member 20 is shifted in the radial direction to such a position as to have the radius smaller than the radius formed at the position on the joint axis, gaps can be closed at central positions in the axial direction of the track grooves 12 and 22. As a result, backlash can be easily eliminated, and hence generation of abnormal noise can be suppressed.

The constant velocity universal joint 1 described above in this embodiment constitutes a driving-wheel bearing unit when the stem portion 18 to the wheel bearing 100 are coupled to each other so that torque can be transmitted, the stem portion 18 extending in the axial direction integrally from the mouth portion 16 in which the inner component 50 including the inner joint member 20, the balls 30, and the cage 40 is housed.

Figure 22:
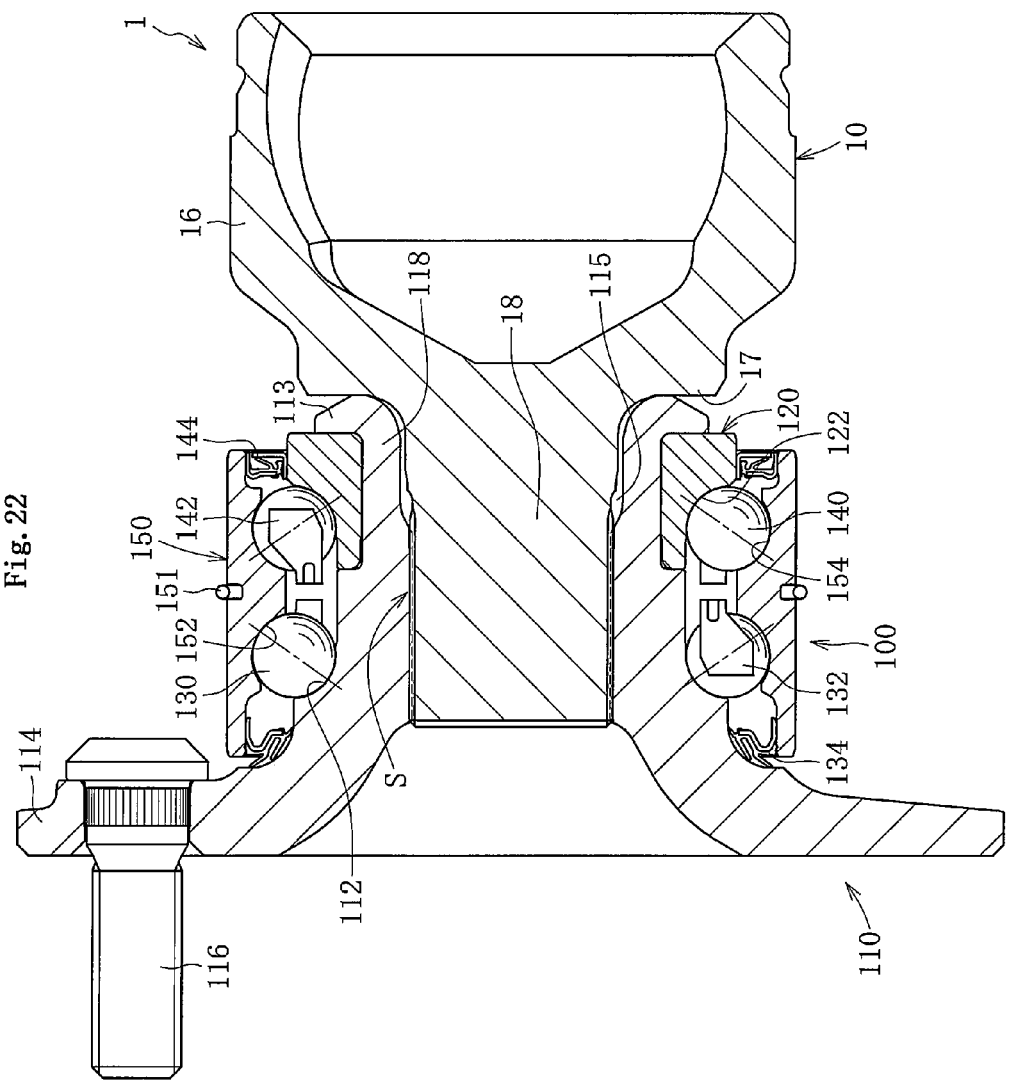
FIG. 22 A sectional view of an overall structure of an integrated type driving-wheel bearing unit in which the constant velocity universal joint of FIG. 1 is coupled to a wheel bearing.

FIG. 22 illustrates, as an example, a structure of a driving-wheel bearing unit in which the constant velocity universal joint 1 of FIG. 1 is coupled to the wheel bearing 100. The driving-wheel bearing unit includes, as main components, a hub wheel 110 and an inner race 120 as inner members, double row rolling elements 130 and 140, an outer race 150 as an outer member, and the constant velocity universal joint 1. The hub wheel 110, the inner race 120, the rolling elements 130 and 140, and the outer race 150 which are described above constitute the wheel bearing 100. Note that, in the description hereinbelow, in a state of being assembled to a vehicle, a side on a vehicle outer side is referred to as an outboard side (left side of the figure), and a side on a center is referred to as an inboard side (right side of the figure).

The hub wheel 110 has an outer peripheral surface provided with an outboard-side inner raceway surface 112, and includes a wheel-attachment flange 114 to which a wheel (not shown) is attached. Hub bolts 116 for fixing a wheel disc are embedded equiangularly to the wheel-attachment flange 114. The inner race 120 is fitted to a small-diameter step portion 118 formed in an inboard-side outer peripheral surface of the hub wheel 110, and an inboard-side inner raceway surface 122 is formed in an outer peripheral surface of the inner race 120. The hub wheel 110 is manufactured by lathing or forging.

The inner race 120 is press-fitted with a proper interference for the purpose of preventing creep. Double row inner raceway surfaces are constituted by the outboard-side inner raceway surface 112 formed in the outer peripheral surface of the hub wheel 110 and the inboard-side inner raceway surface 122 formed in the outer peripheral surface of the inner race 120. The inner race 120 is press-fitted to the small-diameter step portion 118 of the hub wheel 110, and then an end portion of the small-diameter step portion 118 of the hub wheel 110 is plastically deformed outward in the radial direction by orbital forming. With this, a caulked portion 113 is formed. The caulked portion 113 retains the inner race 120 and is integrated with the hub wheel 110 so as to impart preload to the wheel bearing 100.

The outer race 150 has an inner peripheral surface provided with double row outer raceway surfaces 152 and 154 respectively facing the inner raceway surface 112 of the hub wheel 110 and the inner raceway surface 122 of the inner race 120. The outer race 150 is fitted to a knuckle (not shown) extending from a suspension of the vehicle, and is retained by a snap ring 151.

The wheel bearing 100 has a double row angular ball bearing structure, in which the rolling elements 130 and 140 are respectively interposed between the inner raceway surfaces 112 and 122 and the outer raceway surfaces 152 and 154 so that the rolling elements 130 and 140 in the respective double rows are respectively and equiangularly supported by retainers 132 and 142, the inner raceway surfaces 112 and 122 being respectively formed in the outer peripheral surfaces of the hub wheel 110 and the inner race 120, the outer raceway surfaces 152 and 154 being formed in the inner peripheral surface of the outer race 150. Note that, predetermined bearing gaps are set in the wheel bearing 100.

At both-end opening portions of the wheel bearing 100, a pair of seals 134 and 144 for respectively sealing an annular space between the outer race 150 and the hub wheel 110 and an annular space between the outer race 150 and the inner race 120 are fitted along inner diameters of both end portions of the outer race 150 in a manner of being held in sliding contact with the outer peripheral surfaces of the hub wheel 110 and the inner race 120. With this, leakage of the grease filling the inside of the joint and intrusion of water and foreign matter from the outside are prevented.

Figure 23:
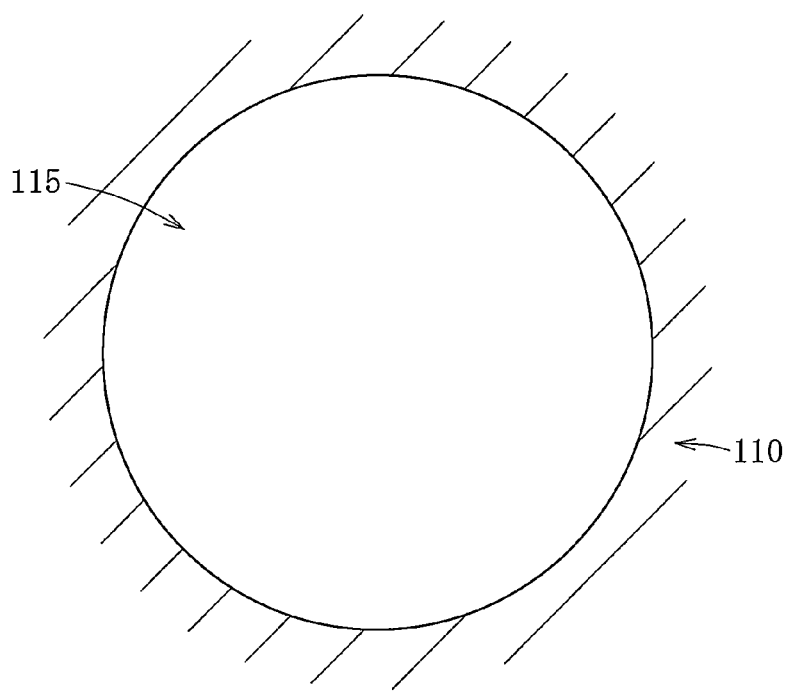
FIG. 23 A sectional view of a shaft hole of a hub wheel of FIG. 22.
Figure 24:
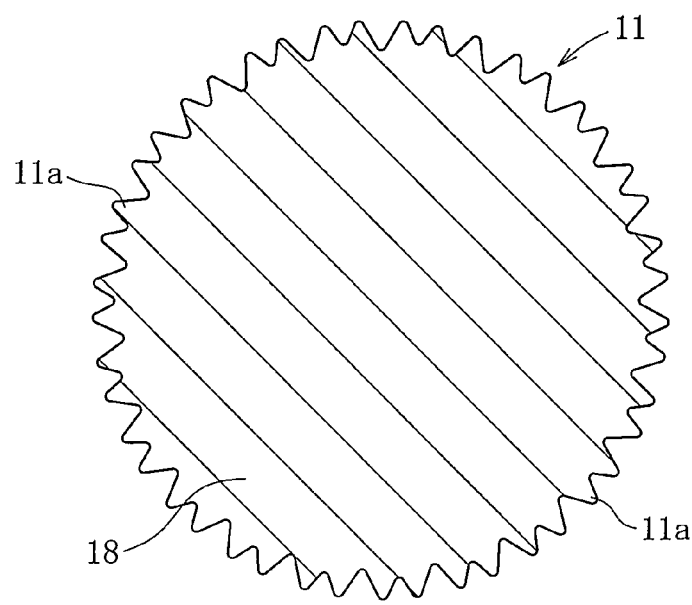
FIG. 24 A sectional view of a stem portion of FIG. 22.

In the driving-wheel bearing unit, a shaft hole 115 of the hub wheel 110 illustrated in FIG. 22 is formed in a simple cylindrical shape (refer to FIG. 23) free from a female spline provided with recessed portions which are formed, at a plurality of parts in a circumferential direction, in an inner peripheral surface thereof and which extend in the axial direction. The driving-wheel bearing unit includes the spline 11 (refer to FIG. 24) provided with projecting portions 11a which are formed, at a plurality of parts in the circumferential direction, on the outer peripheral surface of the stem portion 18 of the outer joint member 10 of the constant velocity universal joint 1 and which extend in the axial direction.

Figure 25:
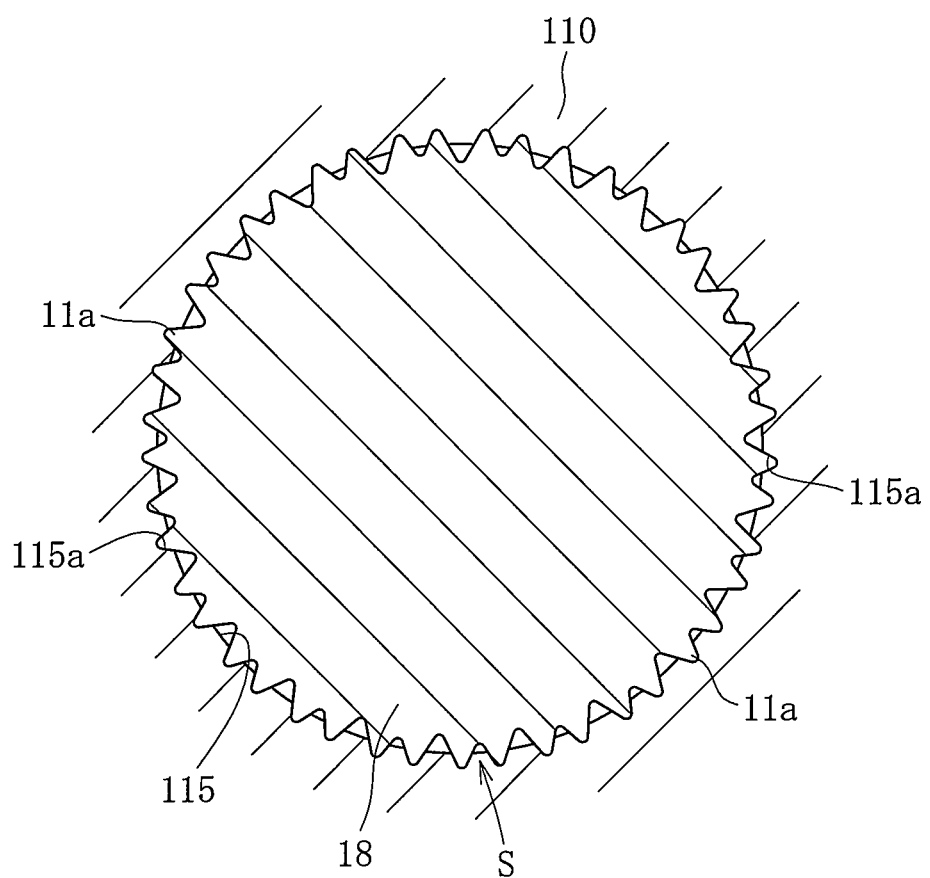
FIG. 25 A sectional view of a projection-recess fitting structure in which the stem portion is press-fitted to the shaft hole of the hub wheel.

The driving-wheel bearing unit has a projection-recess fitting structure S in which, by press-fitting of the stem portion 18 of the outer joint member 10 to the shaft hole 115 of the hub wheel 110, recessed portions 115a to be closely fitted to the spline 11 are formed in the shaft hole 115 of the hub wheel 110 as illustrated in FIG. 25. In other words, the driving-wheel bearing unit has a structure in which the hub wheel 110 and the outer joint member 10 are firmly coupled to each other.

In other words, in the projection-recess fitting structure S in which the recessed portions 115a to be closely fitted to the projecting portions 11a of the spline 11 are formed in the shaft hole 115 of the hub wheel 110, a shape of the spline 11 is transferred to the shaft hole 115 of the hub wheel 110 along with plastic deformation and trimming, the shaft hole 115 being a recessed-portion forming surface on a counterpart side. In this case, when the spline 11 bites into the shaft hole 115 of the hub wheel 110, the hub wheel 110 enters a state of being slightly increased in inner diameter by elastic deformation. As a result, the spline 11 is allowed to move in the axial direction. When the spline 11 stops moving in the axial direction, the inner diameter of the hub wheel 110 should restore the original diameter by an elastic restoring force, and hence is reduced.

With this, the entire of recessed-portion fitting parts of the spline 11 is brought into close contact with the recessed portions 115a corresponding thereto, and hence the outer joint member 10 and the hub wheel 110 can be firmly coupled to and integrated with each other. By such low-cost and highly reliable coupling, backlash of fitting parts of the stem portion 18 and the hub wheel 110 can be eliminated. As a result, unpleasant gear rattling is prevented over a long period of time.

Note that, the inner peripheral surface of the shaft hole 115 of the hub wheel 110 has not undergone curing treatment, in other words, remains a raw material. Meanwhile, the spline 11 of the stem portion 18 of the outer joint member 10 has undergone curing treatment by induction hardening. Thus, work of press-fitting the stem portion 18 to the shaft hole 115 of the hub wheel 110 is facilitated. Although induction hardening, in which a hardening range and a hardening depth can be easily controlled, is suitable as curing treatment on the spline 11 of the stem portion 18 of the outer joint member 10, other curing treatment may be employed. Although the hub wheel 110 is basically a raw material which has not undergone heat treatment, heat treatment may be performed as long as surface hardness of the spline 11 of the stem portion 18 is not exceeded.

As described above in this embodiment, the shaft hole 115 of the hub wheel 110 is free from a spline, and the outer peripheral surface of the stem portion 18 is provided with the spline 11. In contrast, the shaft hole 115 of the hub wheel 110 may be provided with a spline, and the outer peripheral surface of the stem portion 18 may be free from the spline so that the stem portion 18 is formed in a simple columnar shape. In this case, functions and advantages can be obtained, which are the same as those in the case where the shaft hole 115 of the hub wheel 110 is free from a spline and the outer peripheral surface of the stem portion 18 is provided with the spline 11. As a result, the hub wheel 110 and the outer joint member 10 can be firmly coupled to each other by the projection-recess fitting structure S.

Note that, in this embodiment, the caulked portion 113 of the hub wheel 110 and a shoulder portion 17 of the outer joint member 10 are held in contact with each other. In this case, positioning is performed on the stem portion 18 of the outer joint member 10. Thus, dimensional accuracy of the bearing device and an axial length of the projection-recess fitting structure S can be stabilized, with the result that a torque-transmission property can be enhanced.

In this case, under the state in which the caulked portion 113 of the hub wheel 110 and the shoulder portion 17 of the outer joint member 10 are brought into contact with each other, when rotational torque is applied, at the time of starting of a vehicle, from the stem portion 18 of the outer joint member 10 onto the hub wheel 110 in a stationary state, abrupt slip may occur between the caulked portion 113 of the hub wheel 110 and the shoulder portion 17 of the outer joint member 10 owing to torsion of the outer joint member 10, which may lead to a risk of generation of abnormal noise.

However, when the projection-recess fitting structure S is formed while contact surface pressure of the caulked portion 113 of the hub wheel 110 and the shoulder portion 17 of the outer joint member 10 are controlled, generation of abnormal noise owing to contact of the caulked portion 113 of the hub wheel 110 and the shoulder portion 17 of the outer joint member 10 can be suppressed.

Figure 26:
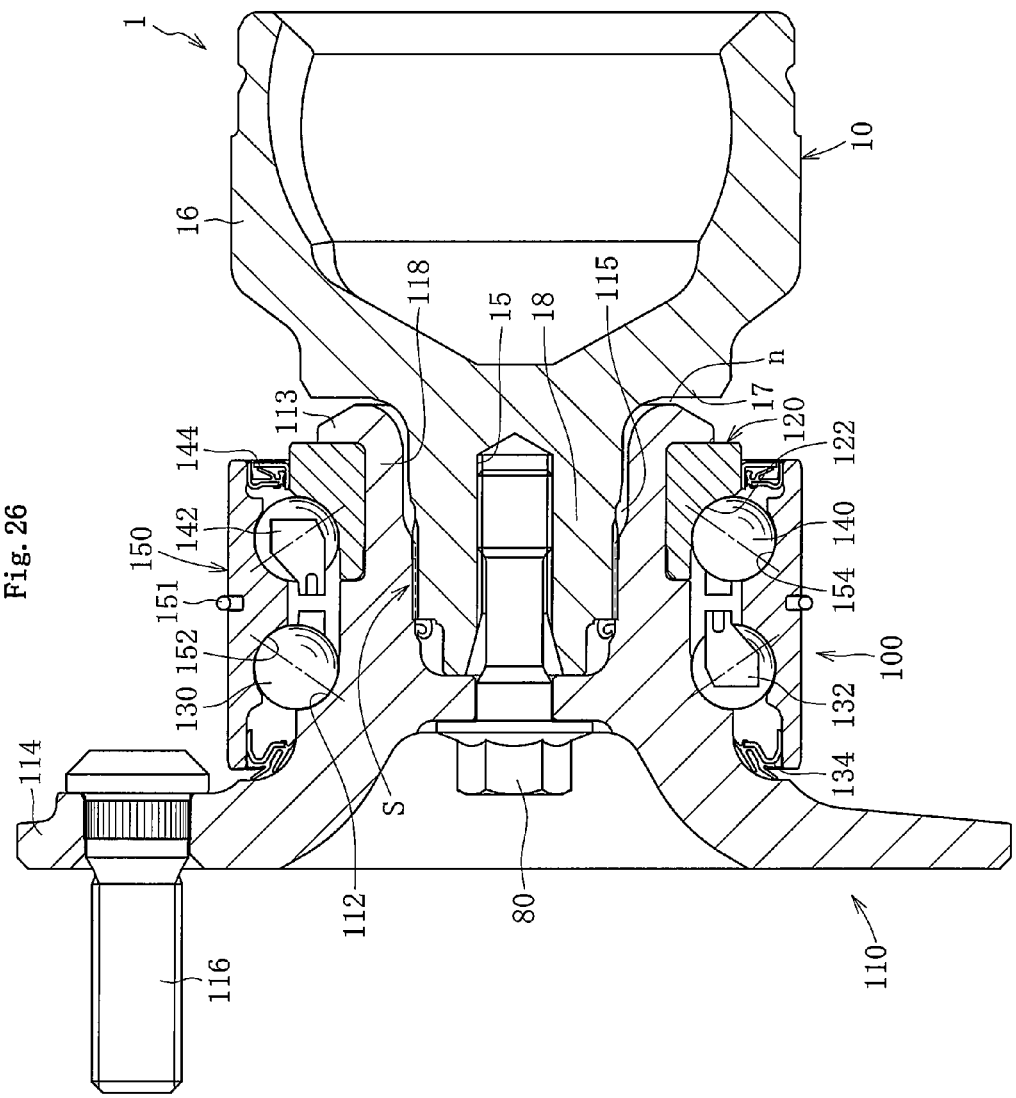
FIG. 26 A sectional view of an overall structure of a separate type driving-wheel bearing unit in which the constant velocity universal joint of FIG. 1 is coupled to the wheel bearing.

As described above in this embodiment, as an example, the driving-wheel bearing unit is illustrated in which the constant velocity universal joint 1 and the wheel bearing 100 are integrated with each other. However, as illustrated in FIG. 26, a driving-wheel bearing unit may be employed in which the constant velocity universal joint 1 and the wheel bearing 100 are separably coupled to each other. Note that, in FIG. 26, the parts same as those in FIG. 22 are denoted by the same reference symbols, and redundant description thereof is omitted.

In the driving-wheel bearing unit, by the projection-recess fitting structure S in which the recessed portions 115a to be closely fitted to the spline 11 are formed in the shaft hole 115 of the hub wheel 110 by press-fitting of the stem portion 18 of the outer joint member 10 to the shaft hole 115 of the hub wheel 110, the hub wheel 110 and the outer joint member 10 are coupled to each other so as to be separable by an axial pulling-out force imparted thereto.

In other words, in the projection-recess fitting structure S, in which the recessed portions 115a to be closely fitted to the projecting portions 11a of the spline 11 are formed in the shaft hole 115 of the hub wheel 110, the shape of the spline 11 is transferred to the shaft hole 115 of the hub wheel 110 along with plastic deformation and trimming, the shaft hole 115 being the recessed-portion forming surface on the counterpart side. In this case, when the spline 11 bites into the shaft hole of the hub wheel 110, the hub wheel 110 enters the state of being slightly increased in inner diameter by elastic deformation. As a result, the spline 11 is allowed to move in the axial direction. When the spline 11 stops moving in the axial direction, the inner diameter of the hub wheel 110 should restore the original diameter by an elastic restoring force, and hence is reduced.

With this, the entire of recessed-portion fitting parts of the spline 11 is brought into close contact with the recessed portions 115a corresponding thereto, and hence the outer joint member 10 and the hub wheel 110 can be coupled to each other so as to be separable by the axial pulling-out force imparted thereto. Meanwhile, a bolt 80 is screwed through intermediation of the hub wheel 110 into a threaded hole 15 formed in the stem portion 18 of the outer joint member 10. With this, the hub wheel 110 and the outer joint member 10 are coupled to each other by the bolt 80.

When a caulking structure is employed, in which the inner race 120 is fixed to the hub wheel 110 as described above, the caulked portion 113 imparts preload to the wheel bearing 100. Thus, it is unnecessary to control the preload to the wheel bearing 100 with use of an axial force exerted by a fastening force of the bolt 80. As a result, the stem portion 18 of the outer joint member 10 can be press-fitted without consideration of a preload amount, and a coupling property (assembly property) of the hub wheel 110 and the outer joint member 10 can be enhanced. Note that, it suffices that the fastening force of the bolt 80 is exerted to such an extent that the hub wheel 110 and the outer joint member 10 are fixed to each other.

In this embodiment, a gap n is formed between the caulked portion 113 as a joint-side end portion of the hub wheel 110 and the shoulder portion 17 as a hub-wheel-facing end portion of the outer joint member 10. As described above, by formation of the gap n between the caulked portion 113 of the hub wheel 110 and the shoulder portion 17 of the outer joint member 10, the caulked portion 113 of the hub wheel 110 and the shoulder portion 17 of the outer joint member 10 enter a non-contact state with respect to each other. The caulked portion 113 of the hub wheel 110 and the shoulder portion 17 of the outer joint member 10 enter the non-contact state with respect to each other, and hence abnormal noise is prevented from being generated owing to contact of the caulked portion 113 of the hub wheel 110 and the shoulder portion 17 of the outer joint member 10.

Figure 27:
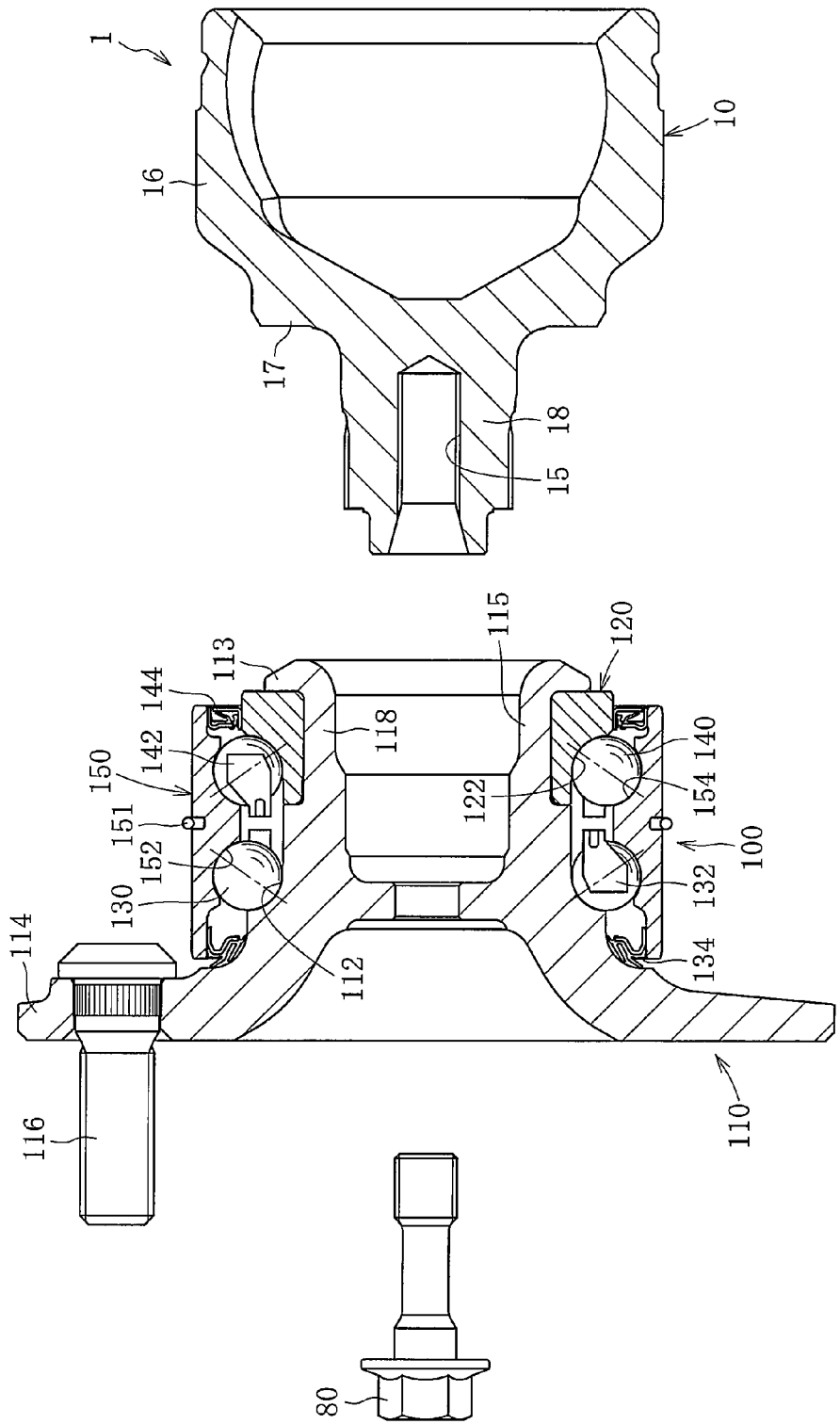
FIG. 27 A sectional view of the driving-wheel bearing unit of FIG. 26, illustrating a state in which the constant velocity universal joint and the wheel bearing are separated from each other.

By the above-mentioned projection-recess fitting structure S, the outer joint member 10 and the hub wheel 110 are coupled to each other so as to be separable by the axial pulling-out force imparted thereto. In this manner, the hub wheel 110 and the outer joint member 10 are separable from each other, and hence maintenance work on the driving-wheel bearing unit is facilitated. In other words, in this maintenance work, anyone of the wheel bearing 100 and the constant velocity universal joint 1 is replaced, the wheel bearing 100 including the hub wheel 110, the inner race 120, the outer race 150, and the rolling elements 130 and 140. At the time of replacement, first, the bolt 80 is detached as illustrated in FIG. 27, and then a pulling-out force larger than a fitting force of the projection-recess fitting structure S is imparted in the axial direction between the hub wheel 110 and the outer joint member 10 so that the outer joint member 10 is pulled out of the hub wheel 110. In this manner, the hub wheel 110 and the outer joint member 10 can be separated from each other.

After the separation, when the wheel bearing 100 continues to be used, it suffices that another constant velocity universal joint 1 to be newly used is assembled to the wheel bearing 100. In contrast, when the constant velocity universal joint 1 continues to be used, it suffices that another wheel bearing 100 to be newly used is assembled to the constant velocity universal joint 1.

As described above in this embodiment, a case is illustrated as an example where the present invention is applied to a driving-wheel bearing device of a type that one of the double row inner raceway surfaces 112 and 122 formed on the inner member including the hub wheel 110 and the inner race 120, in other words, the outboard-side inner raceway surface 112 is formed on the outer periphery of the hub wheel 110 (referred to as third generation). However, the present invention is not limited thereto, and is applicable also to a driving-wheel bearing device of a type that the inboard-side inner raceway surface 122 is formed on the shoulder portion 17 of the outer joint member 10 of the constant velocity universal joint 1 (referred to as fourth generation), and also to a driving-wheel bearing device of a type that a pair of inner races are press-fitted to the outer periphery of the hub wheel 110, and the outboard-side inner raceway surface 112 is formed on an outer periphery of one of the inner races and the inboard-side inner raceway surface 122 is formed on an outer periphery of the other of the inner races (referred to as first or second generation).

As a matter of course, the present invention is not limited at all to the above description in this embodiment, and may be carried out in more various modes without departing from the spirit of the present invention. The scope of the present invention is described by the claims, and includes meaning of equivalents of elements described in the claims and all variations of the claims.

The invention claimed is:

1. A method of manufacturing a fixed type constant velocity universal joint, the fixed type constant velocity universal joint comprising:
   an outer joint member having a cupped shape so as to open at one end and having an inner spherical surface provided with a plurality of track grooves extending in an axial direction;
   an inner joint member having an outer spherical surface provided with a plurality of track grooves extending in the axial direction in pairs with the plurality of track grooves of the outer joint member;
   a plurality of balls interposed between the plurality of track grooves of the outer joint member and the plurality of track grooves of the inner joint member so as to transmit torque; and
   a cage interposed between the inner spherical surface of the outer joint member and the outer spherical surface of the inner joint member so as to hold the plurality of balls,
   wherein at least one of the plurality of track grooves of the outer joint member and the plurality of track grooves of the inner joint member is formed by cold-forging finishing,
   the method comprising:
      ranking, according to outer diameters of the plurality of balls, cages having pocket widths in conformity with the outer diameters of the plurality of balls without ranking outer joint members and inner joint members according to their pitch circle diameters (PCDs);
      measuring a PCD of the outer joint member, which has been arbitrarily selected, and a PCD of the inner joint member, which has been arbitrarily selected; and
      combining the outer joint member, the inner joint member, the plurality of balls, and the cage with each other based on matching in which the plurality of balls and the cage, each having a rank corresponding to a measured value of the PCD of the arbitrarily selected outer joint member and to a measured value of the PCD of the arbitrarily selected inner joint member, are selected with respect to the arbitrarily selected outer joint member and the arbitrarily selected inner joint member.

* * * * *